(12) United States Patent
Kida et al.

(10) Patent No.: US 8,594,928 B2
(45) Date of Patent: Nov. 26, 2013

(54) MAP MATCHING SYSTEM, MAP MATCHING METHOD AND PROGRAM

(71) Applicants: Kouji Kida, Tokyo (JP); Kenichiro Fujiyama, Tokyo (JP)

(72) Inventors: Kouji Kida, Tokyo (JP); Kenichiro Fujiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/740,845

(22) Filed: Jan. 14, 2013

(65) Prior Publication Data

US 2013/0131979 A1 May 23, 2013

Related U.S. Application Data

(62) Division of application No. 12/593,113, filed as application No. PCT/JP2008/055499 on Mar. 25, 2008, now Pat. No. 8,355,864.

(30) Foreign Application Priority Data

Mar. 27, 2007 (JP) ................................. 2007-082632

(51) Int. Cl.
*G01C 21/00* (2006.01)
*G08G 1/123* (2006.01)
*G01C 21/30* (2006.01)

(52) U.S. Cl.
USPC ........... 701/446; 701/409; 701/430; 701/461; 701/532; 701/540; 340/995.14; 340/995.22

(58) Field of Classification Search
USPC ......... 701/400, 409, 411, 424, 430, 437, 445, 701/446, 447, 448, 455, 461, 462, 469, 532, 701/546; 340/995.1, 995.11, 995.14, 340/995.15, 995.17, 995.18, 995.22
See application file for complete search history.

(56) References Cited

U.S. PATENT DOCUMENTS

| | | | |
|---|---|---|---|
| 6,636,802 B1 * | 10/2003 | Nakano et al. ................ | 701/532 |
| 2005/0228584 A1 * | 10/2005 | Adachi et al. ................ | 701/208 |
| 2010/0106410 A1 * | 4/2010 | Adachi et al. ................ | 701/208 |

FOREIGN PATENT DOCUMENTS

| | | |
|---|---|---|
| JP | 11-339174 | 12/1999 |
| JP | 2004-177364 | 6/2004 |

(Continued)

OTHER PUBLICATIONS

U.S. Office Action dated Jul. 5, 2012 in parent case, namely, U.S. Appl. No. 12/593,113.

(Continued)

*Primary Examiner* — Rami Khatib
(74) *Attorney, Agent, or Firm* — Scully, Scott, Murphy & Presser PC

(57) ABSTRACT

Provided is a device, method and program enabling high-speed map matching while maintaining a precision of an analysis based on a map matching result even when event data is transmitted from numerous vehicles.

A grid is obtained by the division of a region in which a road network exists into a latitude direction and a longitude direction by equal spaces based on data stored in the road data storage unit. A grid ID is unitarily assigned to each set of grids whose sets of arcs which are roads are common and arc passing the grid.

An event grid matching unit correlates event data collected from a vehicle and a grid. When the number of pieces of event data correlated with the grid is large, a data selecting unit selects a part of the data. An event road matching unit correlates the selected event data and a road in the grid.

18 Claims, 21 Drawing Sheets

(56) References Cited

FOREIGN PATENT DOCUMENTS

| JP | 2004-280521 | 10/2004 |
|----|-------------|---------|
| JP | 2004-354395 | 12/2004 |
| JP | 2005-147982 | 6/2005 |
| JP | 2005-301643 | 10/2005 |
| JP | 2007-71579 | 3/2007 |

OTHER PUBLICATIONS

Notice of Allowance dated Dec. 18, 2012 in parent case, namely, U.S. Appl. No. 12/593,113.
International Search Report dated Apr. 22, 2008 from related case PCT/JP2008/055499.

* cited by examiner

| ITEM | VALUE |
|---|---|
| ID | E1 |
| TIME AND DATE | 2006/10/26 10:10:00 |
| POSITION | (135.012345, 35.012345) |
| SPEED | 30Km/h |

T101 — ITEM row
T102 — ID
T103 — TIME AND DATE
T104 — POSITION (b)

| ITEM | VALUE |
|---|---|
| ID | E1 |
| TIME AND DATE | 2006/10/26 10:10:00 |
| POSITION | (135.012345, 35.012345) |
| SPEED | 30Km/h |
| DIRECTION | 50° |
| WIPER USE SITUATION | 1 |
| BRAKE USE SITUATION | 0 |

| ARC ID | START POINT | END POINT |
|---|---|---|
| a1 | n1 | n2 |
| a2 | n2 | n5 |
|  |  |  |

T201, T202, T203

| NODE ID | LATITUDE | LONGITUDE |
|---------|----------|-----------|
| n1 | 35.012345 | 135.012345 |
| n2 | 35.023456 | 135.023456 |
|  |  |  |

T204, T205, T206

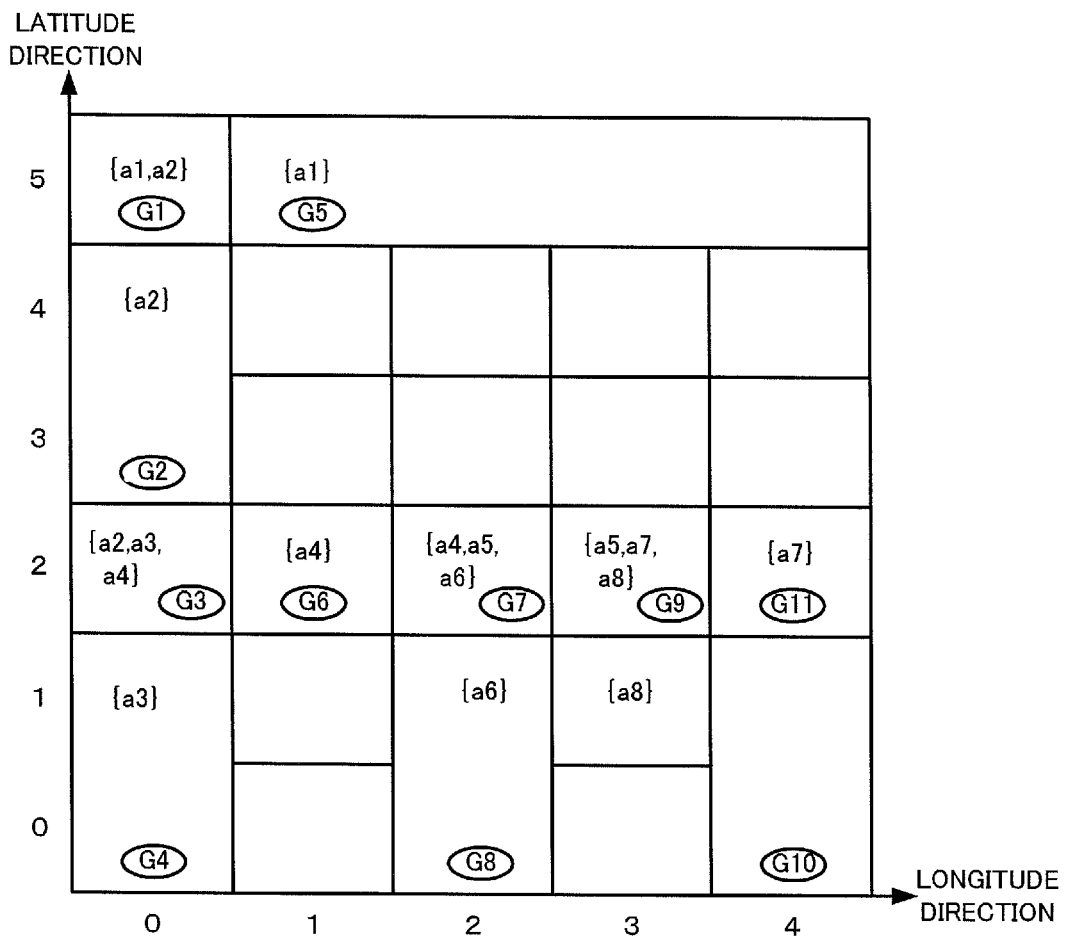

| GRID ID | ARC SET |
|---------|---------|
| G1 | {a1, a2} |
| G2 | {a2} |
| G3 | {a1, a3, a4} |
| | |

| GRID ID | EVENT SET |
|---------|-----------|
| G1 | {E1, E11, E12, E15, E17} |
| G2 | {E4, E10, E18} |
| G3 | {E6, E14, E15, E19, E20} |
| G4 | {E2, E3, E21} |
|  |  |

| GRID ID | EVENT SET | WARNING FLAG |
|---|---|---|
| G1 | {E11, E12} | 0 |
| G2 | {E4, E10} | 0 |
| G3 | {E6, E20} | 0 |
| G4 | {E2, E3} | 0 |
| | | |

IN CASE OF MAXIMUM NUMBER OF EVENTS = 1,
MAXIMUM NUMBER OF EVENTS = 2

| ARC ID | UP/DOWN ATTRIBUTE | EVENT SET |
|---|---|---|
| a1 | UP | {E4} |
|  | DOWN | {E10} |
| a3 | UP | {E2} |
|  | DOWN | {E3} |

FIG. 31

| GRID ID | ARC SET | PRECISION EVALUATION VALUE |
|---|---|---|
| G1 | {a1,a2} | (2,6) |
| G2 | {a2} | (1,2) |
| G3 | {a1,a3,a4} | (3,6) |
| | | |

T0303　T0304　T0305

INCREASING →

| GRID ID | ARC SET | PRECISION EVALUATION VALUE |
|---|---|---|
| G1 | {a1,a2} | (2,⑤) |
| G2 | {a2} | (1,①) |
| G3 | {a1,a3,a4} | (3,⑤) |
| | | |

T0303　T0304　T0305

DECREASING →

| GRID ID | ARC SET | PRECISION EVALUATION VALUE |
|---|---|---|
| G1 | {a1,a2} | (③,6) |
| G2 | {a2} | (②,2) |
| G3 | {a1,a3,a4} | (④,6) |
| | | |

T0303　T0304　T0305

MAP MATCHING SYSTEM, MAP MATCHING METHOD AND PROGRAM

CROSS REFERENCE TO RELATED APPLICATION

This application is a divisional of U.S. patent application Ser. No. 12/593,113, filed Oct. 15, 2009 which is the National Phase of PCT/JP2008/055499 filed Mar. 25, 2008 and claims the benefit of priority from Japanese patent application No. 2007-082632, filed on Mar. 27, 2007, the entire contents and disclosures of each of which each are incorporated herein by reference.

TECHNICAL FIELD

The present invention relates to a map matching system, a map matching method, a map matching device to be applied to a map matching system, a road data generating device, a map matching program and a road data generating program for executing processing to correlate data related to vehicles and road data, and more particularly, to a map matching system, a map matching method, a map matching device to be applied to a map matching system, a road data generating device, a map matching program and a road data generating program which enable high-speed processing.

BACKGROUND ART

Proposed as processing of matching a large volume of data from numerous vehicles with a map at a high speed are the method of efficiently reducing a volume of event data (see Patent Literature 1) and the method of efficiently reducing road candidates to be matched (see Patent Literature 2). Event data is data indicative of a position and a state of a vehicle.

Recited in Patent Literature 1 is the method of narrowing down, on the side of a vehicle as an event generating source, data to be uploaded to a server. In the narrowing-down method recited in Patent Literature 1, with a configuration such as a radius of curvature of a road held as data, a sampling rate is controlled. In a case of traveling on a straight road, for example, the volume of data is suppressed by lowering a sampling rate.

In Patent Literature 2, recited as a latter case is the method, with roads classified into a highest layer (main road network), a middle layer (network of road whose width is not less than 5.5 m) and a lowest layer (all the road networks), of executing matching starting with the highest layer. In the method recited in Patent Literature 2, when a matching result fails to satisfy a certain condition, speed-up is realized by trying matching with a further lower layer.

Recited in Patent Literature 3 is the navigation system using mesh data obtained by dividing a predetermined geographical range into a plurality parts. Recited in Patent Literature 4 is the system for calculating the degree of traffic congestion by calculating an average vehicle speed.

Patent Literature 1: Japanese Patent Laying-Open No. 2004-280521.

Patent Literature 2: Japanese Patent Laying-Open No. 2004-354395.

Patent Literature 3: Japanese Patent Laying-Open No. 2004-177364.

Patent Literature 4: Japanese Patent Laying-Open No. 2005-301643.

The method recited in Patent Literature 1 can be considered to be a method which can be realized by making use of event data from a vehicle aiming at more precisely generating a traveling track of each vehicle. Such a method, however, disables use of event data for other purpose. In a case of estimating traffic congestion information from event data, for example, while each vehicle is allowed to control a sampling rate after recognizing a relationship with surrounding vehicles, the method recited in Patent Literature 1 is allowed to calculate a sampling rate only from fixed information such as a radius of curvature of a road. The method recited in Patent Literature 1 is therefore not applicable to estimation of traffic congestion information.

It is preferable to be usable not only for the specific object of precisely comprehending a traveling track but also for various kinds of analyses related to traffic conditions. Moreover, even when event data is transmitted from a large number of vehicles (e.g. several tens of thousands), it is preferable to correlate event data and roads at a high speed.

With the method recited in Patent Literature 2, the lower the layer becomes, the less the effect of speeding-up becomes, so that when matching with a lowest layer, the effect of speeding-up cannot be obtained. Accordingly, when making use of event data of a vehicle in a lower layer, no effect of speeding-up is obtained. When analysis is made for estimating an arrival time on a long-distance path, for example, because a vehicle uses a main road, high-speed processing is enabled by the method recited in Patent Literature 2, while when estimating an arrival time of a vehicle running on a daily road or the like, the effect of speed-up cannot be obtained.

Under these circumstances, the present invention aims at providing a general-purpose map matching system, a map matching method, a map matching device applicable to such a map matching system, a road data generating device, a map matching program and a road data generating program which enable high-speed map matching while maintaining a precision of an analysis based on a map matching result even when event data is transmitted from a large number of vehicles and which are not limited to a specific purpose.

SUMMARY

A map matching system according to an exemplary aspect of the invention includes a road network storing unit for storing data expressing a road network by a position of a node as a crossing and by an arc which is a road with a crossing as a start point and an end point, a road grid dividing unit for deriving a grid obtained by the division of a region where a road network exists in a latitude direction and a longitude direction by equal spaces and correlating the grid and an arc crossing the grid, a grid road combining unit for assigning a common arc ID to a plurality of grids which are adjacent to each other and whose sets of arcs correlated are coincident and assigning an arc ID to a grid whose set of arcs correlated is different from a set of arcs of any of adjacent grids and storing information indicative of a relationship among a range of a grid derived by the road grid dividing unit, a grid ID and an arc passing the grid to a storage device, an event collecting unit for receiving event data indicative of a position and a state of a vehicle, an event grid matching unit for specifying a grid ID of a grid to which a generation position included in event data received by the event collecting unit belongs to generate information with the grid ID and the event data correlated with reference to the information stored in the storage device, an event data selecting unit for selecting, on a basis of a grid ID correlated with event data by the event grid matching unit, when the number of pieces of event data correlated is larger than a threshold value, as many pieces of event data as the threshold value and when the number of pieces of event data correlated is not more than the threshold value, selecting all the event data correlated, an event road matching unit for specifying, on a basis of each event data selected by the event data selecting unit, an arc closest to a generation position of the event data from among arcs correlated with a grid ID corresponding to the event data, and an event road storing unit for storing information indicative of a correspondence relationship between an arc specified by the event road matching unit and event data.

According to an exemplary aspect of the invention, a map matching device accessible to a road data storage device which stores information indicative of a relationship among a range of each grid obtained by dividing a region where a road network exists in a latitude direction and a longitude direction by equal spaces, a grid ID unitarily assigned to each set of grids whose sets of arcs which are roads are common and an arc passing the grid, includes an event collecting unit for receiving event data indicative of a position and a state of a vehicle, an event grid matching unit for specifying a grid ID of a grid to which a generation position included in event data received by the event collecting unit belongs to generate information with the grid ID and the event data correlated with reference to the information stored in the road data storage device, an event data selecting unit for selecting, on a basis of a grid ID correlated with event data by the event grid matching unit, when the number of pieces of event data correlated is larger than a threshold value, as many pieces of event data as the threshold value and when the number of pieces of event data correlated is not more than the threshold value, selecting all the event data correlated, an event road matching unit for specifying, on a basis of each event data selected by the event data selecting unit, an arc closest to a generation position of the event data from among arcs correlated with a grid ID corresponding to the event data, and an event road storing unit for storing information indicative of a correspondence relationship between an arc specified by the event road matching unit and event data.

According to an exemplary aspect of the invention, a road data generation device which is accessible to a road network storage unit for storing data expressing a road network by a position of a node as a crossing and by an arc that is a road with a crossing as a start point and an end point and which generates data for use in map matching, includes a road grid dividing unit for deriving a grid obtained by the division of a region where a road network exists in a latitude direction and a longitude direction by equal spaces and correlating the grid and an arc crossing the grid, and a grid road combining unit for assigning a common arc ID to a plurality of grids which are adjacent to each other and whose sets of arcs correlated are coincident and assigning an arc ID to a grid whose set of arcs correlated is different from a set of arcs of any of adjacent grids to generate information indicative of a relationship among a range of a grid derived by the road grid dividing unit, a grid ID and an arc passing the grid.

According to an exemplary aspect of the invention, a map matching method to be applied to a map matching device accessible to a road data storage device which stores information indicative of a relationship among a range of each grid obtained by dividing a region where a road network exists in a latitude direction and a longitude direction by equal spaces, a grid ID unitarily assigned to each set of grids whose sets of arcs which are roads are common and an arc passing the grid, wherein an event collecting unit receives event data indicative of a position and a state of a vehicle, an event grid matching unit specifies a grid ID of a grid to which a generation position included in event data received by the event collecting unit belongs to generate information with the grid ID and the event data correlated with reference to the information stored in the road data storage device, an event data selecting unit selects, on a basis of a grid ID correlated with event data by the event grid matching unit, when the number of pieces of event data correlated is larger than a threshold value, as many pieces of event data as the threshold value and when the number of pieces of event data correlated is not more than the threshold value, selects all the event data correlated, and an event road matching unit specifies, on a basis of each event data selected by the event data selecting unit, an arc closest to a generation position of the event data from among arcs correlated with a grid ID corresponding to the event data.

According to an exemplary aspect of the invention, a map matching program mounted on a computer accessible to a road data storage device which stores information indicative of a relationship among a range of each grid obtained by dividing a region where a road network exists in a latitude direction and a longitude direction by equal spaces, a grid ID unitarily assigned to each set of grids whose sets of arcs which are roads are common and an arc passing the grid, which causes the computer to execute an event collecting processing of receiving event data indicative of a position and a state of a vehicle, an event grid matching processing of specifying a grid ID of a grid to which a generation position included in event data received belongs to generate information with the grid ID and the event data correlated with reference to the information stored in the road data storage device, an event data selecting processing of selecting, on a basis of a grid ID correlated with event data by the event grid matching processing, when the number of pieces of event data correlated is larger than a threshold value, as many pieces of event data as the threshold value and when the number of pieces of event data correlated is not more than the threshold value, selecting all the event data correlated, and an event road matching processing of specifying, on a basis of each event data selected by the event data selecting processing, an arc closest to a generation position of the event data from among arcs correlated with a grid ID corresponding to the event data.

According to an exemplary aspect of the invention, a road data generation program mounted on a computer accessible to a road network storage device which stores data expressing a road network by a position of a node as a crossing and by an arc that is a road with a crossing as a start point and an end point, which causes the computer to execute a road grid dividing processing of deriving a grid obtained by the division of a region where a road network exists in a latitude direction and a longitude direction by equal spaces and correlating the grid and an arc crossing the grid, and a grid road combining processing of assigning a common arc ID to a plurality of grids which are adjacent to each other and whose sets of arcs correlated are coincident and assigning an arc ID to a grid whose set of arcs correlated is different from a set of arcs of any of adjacent grids to generate information indicative of a relationship among a range of a grid derived by the road grid dividing processing, a grid ID and an arc passing the grid.

The present invention enables reduction in the amount of processing to be executed for each event ID and reduction in the amount of processing of an event road matching unit to be executed on an event data basis. As a result, the processing can be sped up.

In addition, since pieces of event data of vehicles traveling on the same road are similar in many cases, analysis precision can be maintained even when as many pieces of event data as the number of a threshold value are selected from event data correlated with a grid ID. Even when the event data is transmitted from a large number of vehicles, therefore, map matching can be executed at a high speed while maintaining a precision of an analysis based on a map matching result. In addition, since a purpose of use of information indicative of a correspondence relationship between event data whose arc is specified by an event road matching unit and the arc is not limited, the information can be generally used for various kinds of analyses.

BRIEF DESCRIPTION OF THE DRAWINGS

FIG. 2 is a diagram for use in explaining an example of event data;

FIG. 3 is a diagram for use in explaining an arc information table;

FIG. 8 is a diagram for use in schematically explaining a grid having been subjected to combining processing;

FIG. 9 is a diagram for use in explaining an example of an array grid table;

FIG. 31 is a diagram for use in explaining an example of operation of changing a maximum number of events and a minimum number of events.

EXEMPLARY EMBODIMENT

In the following, exemplary embodiments of the present invention will be detailed with reference to the drawings.

First Exemplary Embodiment

Figure 1:
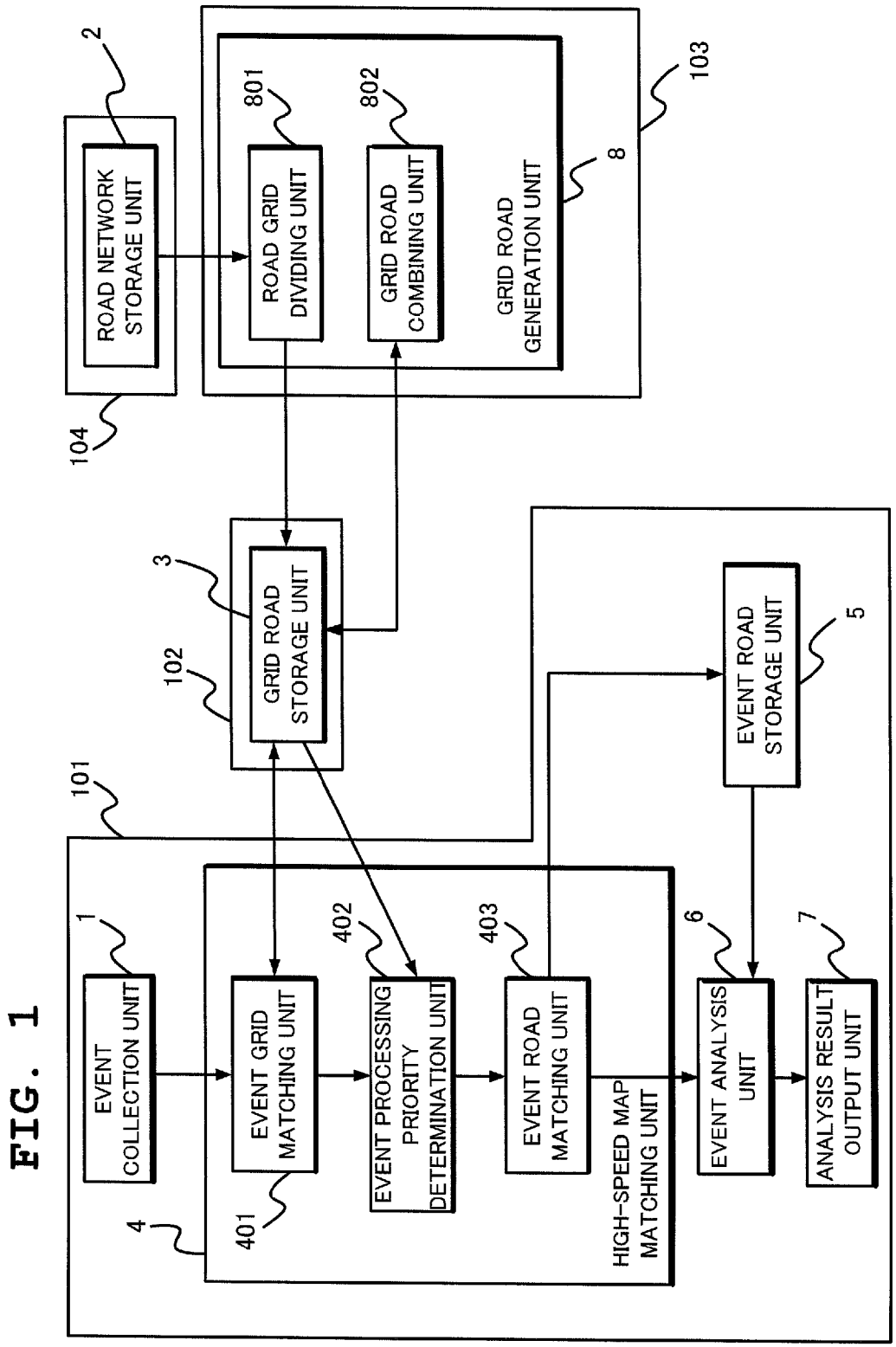
FIG. 1 is a block diagram showing an example of a first exemplary embodiment according to the present invention.

FIG. 1 is a block diagram showing an example of a first exemplary embodiment of the present invention. A map matching system of the present invention comprises a map matching device 101, a road data storage device 102, a road data generation device 103 and a road network storage device 104.

The road network storage device 104 comprises a road network storage unit 2 for storing data of a road network as a network of roads connecting crossings.

The road data generation device 103 generates data of a road belonging to each region in a case where a road network indicated by data stored in the road network storage unit 2 is divided into a plurality of regions. Region obtained by dividing the entire region in which the road network exists will be referred to as a grid. The road data generation device 103 generates data with a grid and a road belonging to the grid correlated with each other on a grid basis.

The road data storage device 102 comprises a grid road storage unit 3. The grid road storage unit 3 is a storage device for storing data generated by a grid road generation unit 8 (data with a grid and a road correlated with each other on a grid basis).

The map matching device 101 comprises an event collection unit 1, a high-speed map matching unit 4, an event road storage unit 5, an event analysis unit 6 and an analysis result output unit 7.

The event collection unit 1 receives event data from a probe car on the road. Event data is data indicative of a position and a state of a vehicle and a vehicle which transmits event data will be referred to as a probe car. There exist a plurality of probe cars and event data can be received from many probe cars like several tens of thousands. A base station disposed in each area receives event data from a probe car through a radio communication network and the event collection unit 1 receives event data from each base station. Thus, the event collection unit 1 receives event data from the probe car through the base station. In the following, a probe car will be simply denoted as a vehicle.

Structure of neither a base station nor a vehicle which generates event data is limited in particular. Communication protocol among the event collection unit 1, a base station and a vehicle is not limited in particular, either. The event collection unit 1, which comprises a storage device, accumulates received event data in the storage device and sorts accumulated event data in the order of generation at fixed time intervals, for example, to cause an event grid matching unit 401 (more specifically, an event storage unit 40101) that the high-speed map matching unit 4 has to store the data. The event collection unit 1 deletes event data stored in the event grid matching unit 401 from the storage device that the event collection unit 1 itself has.

The high-speed map matching unit 4 refers to data of a grid stored in the grid road storage unit 3 to execute map matching processing of correlating event data received by the event collection unit 1 and each road.

The event road storage unit 5 is a storage device which stores a correspondence relationship between road and event data correlated by the high-speed map matching unit 4. The event analysis unit 6 analyzes a traffic condition by referring to a correspondence relationship between a road and event data stored in the event road storage unit 5 and each event data. While one of examples of an analysis executable by the event analysis unit 6 is determination of the degree of traffic congestion on a road, for example, a kind of analysis executed by the event analysis unit 6 is not limited in particular. The analysis result output unit 7 is an output device which outputs an analysis result obtained by the event analysis unit 6. The analysis result output unit 7 is, for example, a display device which displays an analysis result. The event analysis unit 6 is realized, for example, by a CPU operable according to a program.

While shown in FIG. 1 is an example of a structure where the map matching system comprises the map matching device 101, the road data storage device 102, the road data generation device 103 and the road network storage device 104 and each device has each of the above-described units, the map matching system is not limited to the structure shown in FIG. 1. It is, for example, possible to realize the road network storage unit 2 and the grid road storage unit 3 by the same device. Also possible is a structure with all of the above-described respective units provided in the same device. This will be also the case with other exemplary embodiments which will be described later.

In the following, description will be made of each component of the map matching system according to the present invention and operation of the same, and each data to be applied to the present invention.

The grid road generation unit 8 has a road grid dividing unit 801 and a grid road combining unit 802. The road grid dividing unit 801 generates data with each divisional region (grid) obtained by dividing a region where a road network exists into equal spaces in both a latitude direction and a longitude direction and a road correlated with each other based on data stored in the road network storage unit 2. A division space in the latitude direction and a division space in the longitude direction may coincide with each other or differ from each other. When among data generated by the road grid dividing unit 801 (data with a grid and a road correlated with each other), there exist a plurality of grids which are located adjacent to each other and whose sets of roads correlated with the grids are coincident, the grid road combining unit 802 applies a common grid ID to the plurality of grids to make one grid. Also to a grid whose set of roads correlated differs from that of any of adjacent grids, apply a grid ID. Grid ID is identification information for identifying each grid, which is unitarily applied to each set of grids whose set of passing arcs is common. Thus, applying a grid ID to a set of grids adjacent to each other whose set of correlated roads is common and to a grid whose set of correlated roads is different from any of adjacent grids will be denoted as grid combining processing. The grid road combining unit 802 causes the grid road storage unit 3 to store a correspondence relationship among a road, a grid as of before combination and a grid as of after combining processing. For example, generate information indicative of a correspondence relationship between each grid as of before combining processing and a grid ID applied by the combining processing and information indicative of a correspondence relationship between a grid ID and a road corresponding to a grid indicated by the grid ID to cause the grid road storage unit 3 to store the generated information.

After the combining processing, a grid to which one grid ID is assigned will be handled as one grid. When one grid ID is assigned to a plurality of adjacent grids, accordingly, the plurality of grids will be one grid.

The road grid dividing unit 801 causes the grid road storage unit 3 to store each information derived and the grid road combining unit 802 reads the information to execute the combining processing and causes the grid road storage unit 3 to store the information.

The road grid dividing unit 801 and the grid road combining unit 802 are realized, for example, by a CPU operable according to a program. The road data generation unit 103, for example, stores in advance a road data generation program for causing a computer to execute the operation of the road grid dividing unit 801 and the grid road combining unit 802, so that a CPU provided in the road data generation device 103 operates according to the road data generation program.

The high-speed map matching unit 4 has the event grid matching unit 401, an event processing priority determination unit 402 and an event road matching unit 403. The event grid matching unit 401 correlates a grid as of after the combining processing which is stored in the grid road storage unit 3 and event data generated within a range of the grid. When the number of pieces of event data correlated with the grid as of after the combining processing is larger than a value as a threshold value (hereinafter referred to as the maximum number of events), the event processing priority determination unit 402 extracts as many pieces of event data as the maximum number of events from the event data. On the other hand, when the number of pieces of event data correlated with the grid as of after the combining processing is less than the maximum number of events, the event processing priority determination unit 402 extracts all the event data correlated with the grid. The event processing priority determination unit 402 executes the processing on a grid basis. The maximum number of events is a threshold value determined in advance for enabling both an analysis precision to be maintained and matching processing to be sped up. The event road matching unit 403 calculates a distance between a road in a grid correlated with event data and a generation position of the event data with respect to all the event data extracted by the event processing priority determination unit 402 and specifies a road in which the event data is generated to correlate the event data and the road.

The event grid matching unit 401 is realized, for example, by a storage device and a CPU operable according to a program. The event processing priority determination unit 402 and the event road matching unit 403 are realized by a CPU operable according to a program.

In the map matching unit 101, for example, the event collection unit 1, the event grid matching unit 401, the event processing priority determination unit 402, the event road matching unit 403 and a CPU which stores in advance a map matching program for causing a computer to execute operation of the event analysis unit 6 and is provided in the map matching device 101 operate according to the map matching program.

Here, description will be made of event data. FIG. 2 is a diagram for use in explaining an example of event data. FIG. 2(a) shows data included in event data to be applied to the present invention. Vehicle, as illustrated in FIG. 2(a), generates event data including at least an ID of event data, event data generation time and date, and a position and a speed of the vehicle at the time of event data generation. Although the ID, generation time and date, and vehicle position and speed are data that should be included in event data to be applied to the present invention, other data such as a direction, a wiper use situation and brake use information may be included as shown in FIG. 2(b).

ID indicated with a reference numeral T101 applied in FIG. 2 is identification information for identifying individual event data. Although shown in FIG. 2 is "E1" applied as ID, with respect to a vehicle, a character string including identification information of the vehicle and event data generation time, for example, is taken as an ID. ID may be any information that enables identification of event data generated by a plurality of vehicles.

Time and date T102 shown in FIG. 2 is generation time and date of event data (i.e. generation time and date when a vehicle generates event data). Although in FIG. 2, the time and date T102 is expressed by date and time, time and date may be represented by other expression form. The time and date T102 may be expressed, for example, by a lapse of seconds from certain time and date.

A position T103 shown in FIG. 2 is a position of a vehicle at the time of event data generation. In FIG. 2, while the position is expressed in a form (longitude, latitude), the position may be expressed by other form. The position may be expressed, for example, by a distance and an angle from a certain reference point. Angle in this case is an angle between a line segment linking the reference point and a vehicle position and a reference axis passing the reference point.

A speed T104 shown in FIG. 2 is a speed of a vehicle at the time of event data generation. In FIG. 2, while the speed is expressed by kilometers, it may be expressed by other form. The speed may be, for example, a value expressing a speed as miles per minute.

Event data includes at least an ID, time and date, a position and a speed. The event data may further include other data. Shown in FIG. 2(b) is an example of event data further including other data.

A direction T105 shown in FIG. 2(b) is a vehicle forwarding direction at the time of event data generation. In FIG. 2(b), while the direction is expressed by an angle from a certain reference direction, the direction may be expressed in other form. The direction may be expressed as, for example, north-north east.

A wiper use situation T106 shown in FIG. 2(b) is data indicating whether a vehicle uses a wiper or not at the time of event data generation. When the vehicle uses a wiper at the time of event data generation, the data is set to be "1" and when not using, it is set to be "0", for example. Similarly, a brake use situation T107 shown in FIG. 2(b) is data indicating whether a vehicle uses a brake or not at the time of event data generation. When the vehicle uses a brake at the time of event data generation, the data is set to be "1" and when not using, it is set to be "0", for example. Similarly, a vehicle's light use situation at the time of event data generation may be included in event data.

Description will be made of data of a road network stored in the road network storage unit 2. Road network data stored in the road network storage unit 2 is expressed by a crossing (node) and a road (arc) linking crossings. In the example shown in the following, a road is expressed as a straight line from a crossing at a start point and a crossing at an end point for the simplicity of explanation. When expressing a curved road, the road can be expressed by arranging a node as a subsidiary in the middle of the curved road and linking short arcs.

Figures 4, 5:
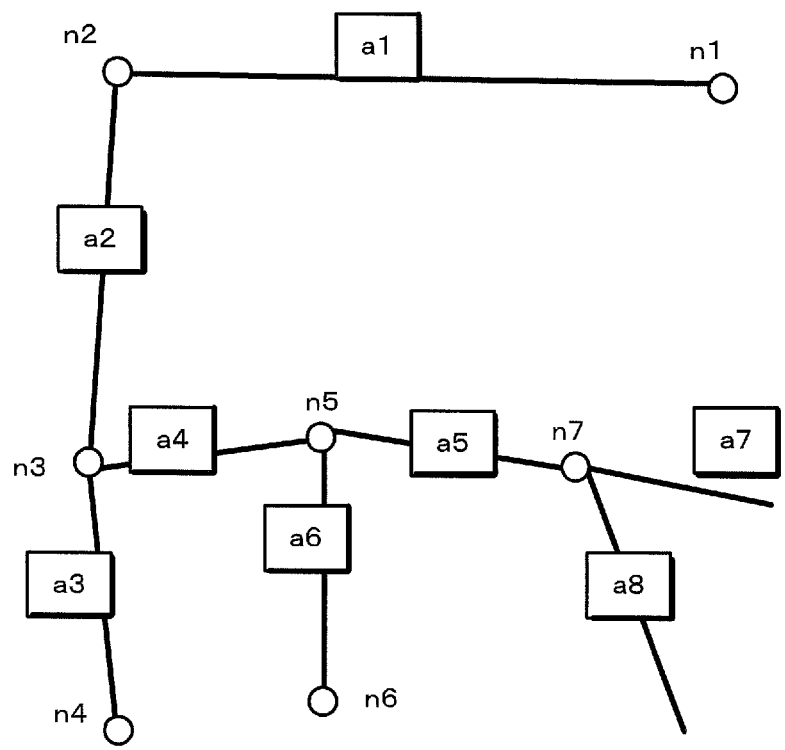
FIG. 4 is a diagram for use in explaining a node information table.
FIG. 5 is a diagram for use in schematically explaining an example of a road network.

The road network storage unit 2 is a storage device for storing an arc information table shown in FIG. 3 and a node information table shown in FIG. 4. A road network is expressed by the arc information table and the node information table.

FIG. 3 shows the arc information table. In FIG. 3, an arc ID indicated by a reference numeral T201 is identification information for identifying each road. The arc ID may be a serial number assigned to a road. A start point T202 represents an ID of a crossing as a start point of the road and an end point T203 represents an ID of a crossing as an end point of the road. The arc information table is a set of information with the arc ID, the start point and the end point correlated with each other.

FIG. 4 shows the node information table. In FIG. 4, a node ID indicated by a reference numeral T204 is identification information for identifying each crossing. The node ID may be a serial number assigned to a crossing. A latitude T205 represents a latitude at a crossing and a longitude T206 represents a longitude at a crossing. While a position at a crossing is here expressed by a latitude and longitude, expression of a position of a crossing is not limited to a latitude and a longitude. The node information table is a set of information with a node ID and a node position correlated with each other.

The start point T202 and the end point T203 in the arc information table are expressed by a node ID included in the node information table.

FIG. 5 is a diagram for schematically showing an example of a road network represented by the arc information table and the node information table. In FIG. 5, a line segment represents an arc and a label starting with "a" denotes an arc ID. Circle represents a crossing and a label starting with "n" denotes a node ID. A node position indicated in FIG. 5 is assumed to represent the same position relationship in space as that of an actual crossing on the map.

Next, description will be made of the grid road generation unit 8.

Figure 6:
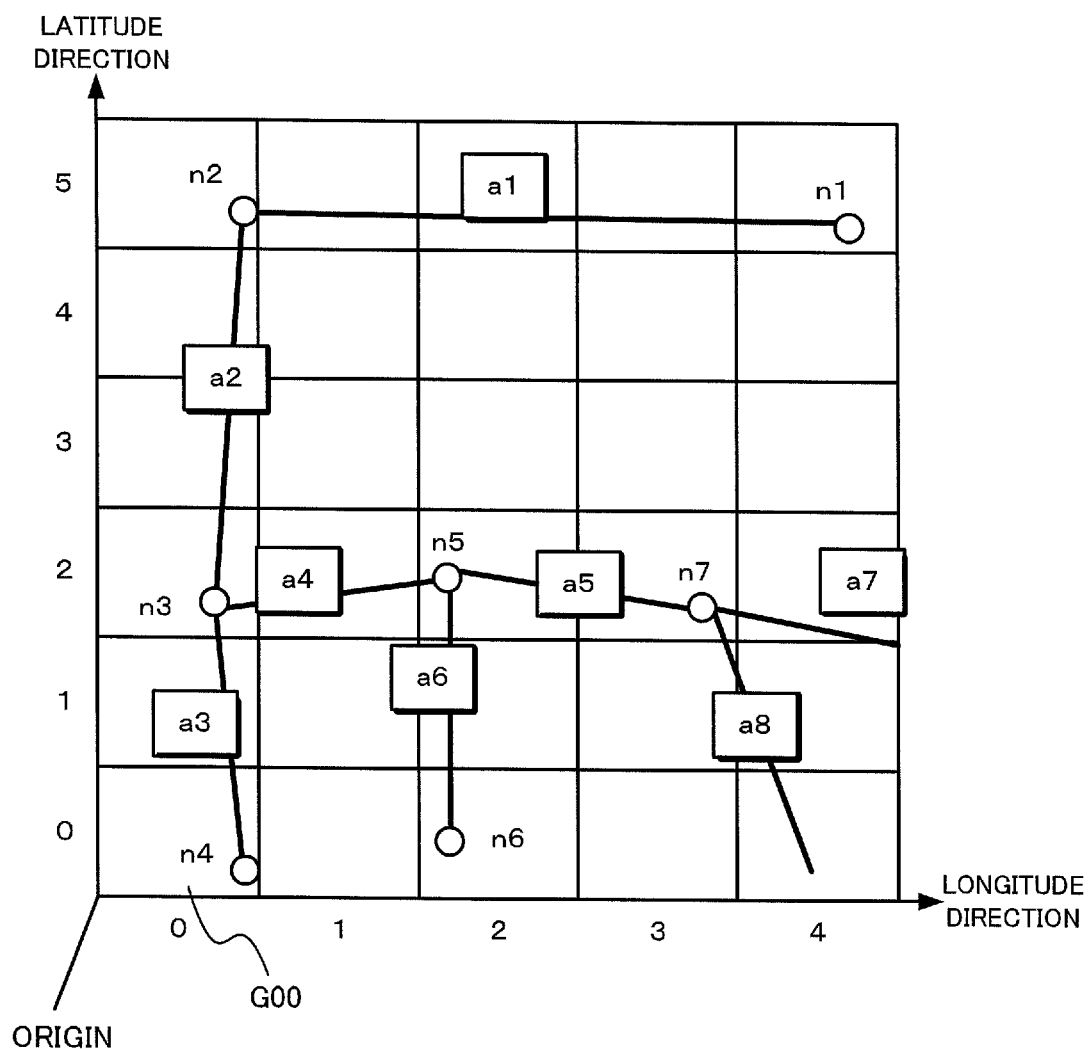
FIG. 6 is a diagram for use in schematically explaining a divided road network.

The road grid dividing unit 801 derives each divisional region (grid) obtained by dividing a region of a road network represented by the arc information table and the node information table stored in the road network storage unit 2 into the latitude direction and the longitude direction by an equal space. FIG. 6 is a diagram schematically showing a divided road network. The road grid dividing unit 801 sequentially assigns indexes (coordinates) starting with 0 in the division range in the latitude direction. Similarly, sequentially assign indexes (coordinates) starting with 0 in the division range in the longitude direction. A grid in which both the index in the latitude direction and the index in the longitude direction attain 0 will be denoted as an origin grid. In the example shown in FIG. 6, a grid including a node n4 (grid with a reference numeral G00 attached) is an origin grid. Among four points to be an apex of the origin grid, a point whose latitude and longitude are minimum (in the example shown in FIG. 6, a point lower left of the grid G00) will be referred to as an origin. In the following description, the grid will be expressed as G (coordinate in the latitude direction, coordinate in the longitude direction). According to the expression, the origin grid G00 will be represented as G(0,0).

When dividing a region of a road network into a latitude direction and a longitude direction by an equal space, the road grid dividing unit 801 only needs to make equal-space division starting with a latitude and a longitude as a reference. By the division into equal spaces starting with a latitude and a longitude as a reference enables a latitude and a longitude of an apex of each grid to be specified. The road grid dividing unit 801 calculates and stores a set of arcs crossing each grid. The road grid dividing unit 801 specifies a set of arcs (roads) crossing one grid in a manner as described above. The road grid dividing unit 801 extracts a node ID of a node (crossing)

whose latitude and longitude fall within a range of a grid from the node information table (see FIG. 4) and extracts an arc ID whose start point or an end point is the node ID from the arc information table (see FIG. 3). A set of extracted arc IDs is a set of arcs crossing one grid. The road grid dividing unit 801 executes processing of specifying a set of arcs crossing a grid on a grid basis. Then, store a correspondence relationship between a grid and an arc crossing the grid.

In the following, when expressing a set of elements such as an arc, it is expressed by arranging each element within a parenthesis {first element, second element, . . . }. In the example shown in FIG. 6, a grid G (2,2) includes three arcs a4, a5 and a6. Therefore, a set of arcs crossing the grid G (2,2) is represented as {a4, a5, a6}.

Figure 7:
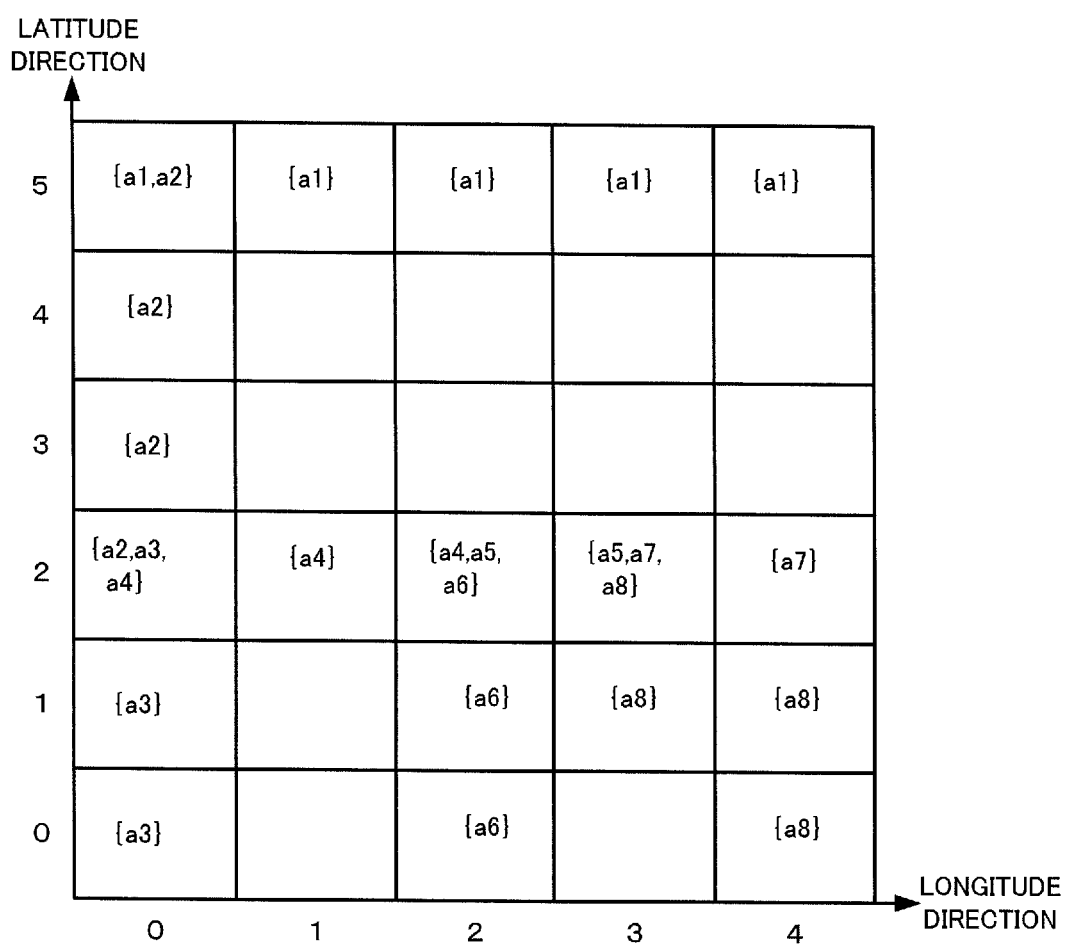
FIG. 7 is a diagram for use in explaining a set of arcs on a grid basis.

FIG. 7 is a diagram for use in explaining a set of arcs extracted as an arc crossing a grid on a grid basis.

The grid road combining unit 802 executes combining processing with respect to data with a grid and an arc correlated with each other which is generated by the road grid dividing unit 801. More specifically, when there exist a plurality of grids which are adjacent to each other and whose sets of arcs correlated with the grids are the same, attach one grid ID to the plurality of grids. Also attach a grid ID to a grid whose set of correlated roads is different from that of any of adjacent grids.

Noting one grid, the grid road combining unit 802 determines whether among grids adjacent to the noted grid, there exists a grid to which the same set of arcs as a set of arcs correlated with the noted grid is correlated and when there exists such a grid, assigns the same grid ID to the noted grid and to a grid to which the same set of arcs as the set of arcs correlated with the noted grid is correlated. The grid road combining unit 802 determines whether among grids adjacent to the grid to which the grid ID in question is assigned, there exists a grid to which the same set of arcs as a set of arcs correlated with the noted grid is correlated and when such a grid exists, assigns the same grid ID to the grid as well. When there exists, among adjacent grids, no grid to which the same set of arcs as the set of arcs correlated with the noted grid is correlated, change the noted grid. In addition, note one grid and determine whether there exist, among grids adjacent to the noted grid, a grid to which the same set of arcs as a set of arcs correlated with the noted grid is correlated and when such a grid fails to exist, assign the grid ID to the noted grid to change the noted grid. Grid ID to be assigned to a grid for identifying the grid may be, for example, a serial number. The grid road combining unit 802 repeats the processing and when there no more exists a grid which is yet to be noted and to which no grid ID is assigned, end the combining processing.

In the example shown in FIG. 7, with 24 initial grids from G(0,0) to G(4,5) existing before the combining processing, execute processing sequentially noting the grids in the order of the grid. When noting the grid G(0,0), grids adjacent to G(0,0) are grids G(1,0) and G(0,1). A set of arcs corresponding to the grid G (1,0) is an empty set and a set of arcs corresponding to the grid G (0,1) is {a3}. Since a set of arcs corresponding to the noted grid G(0,0) is {a3}, the grids G(0,0) and G(0,1) will be combined. In other words, a common grid ID is assigned to the grids G(0,0) and G(0,1). Even when adjacent grids have the same arc correlated, if their sets of arcs differ, the grids will not be combined. For example, although to both the grid G(0,1) and G(02), the arc a3 is correlated in FIG. 7, because {a3} and {a2,a3,a4} differ as a set of arcs, the grids G(0,1) and G(0,2) will not be combined.

FIG. 8 is a diagram for use in schematically explaining a grid as of after the combining processing to the grid illustrated in FIG. 7. In the example shown in FIG. 8, a grid ID G4 is assigned to a grid with the grid G(0,0) and the grid (0,1) combined.

Figures 10, 11:
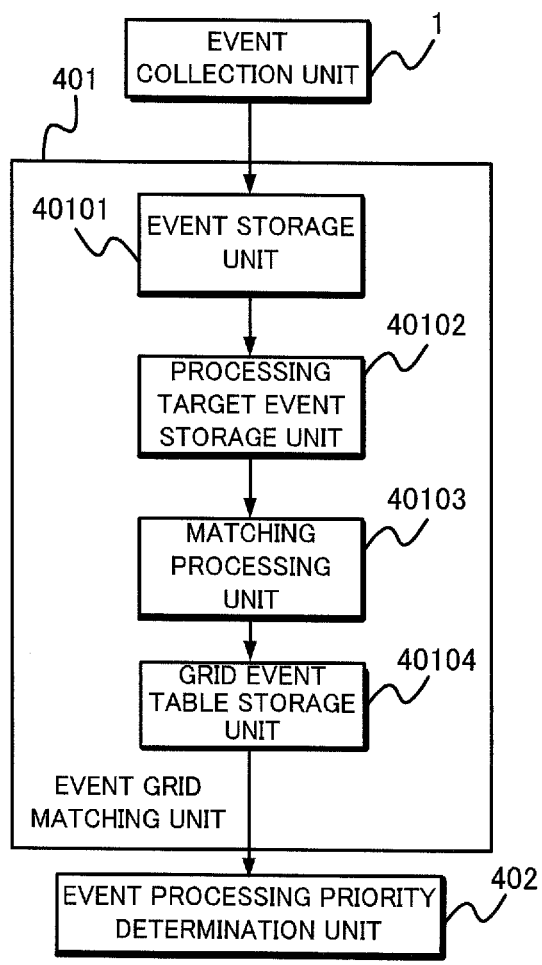
FIG. 10 is a diagram for use in explaining an example of a grid arc table.
FIG. 11 is a diagram for use in explaining an example of a structure of an event grid matching unit.

After the combining processing, the grid road combining unit 802 causes the grid road storage unit 3 to store a correspondence relationship among an arc, a grid as of before the combining processing and a grid as of after the combining processing. In the present example, the grid road combining unit 802 causes the grid road storage unit 3 to store an array grid table illustrated in FIG. 9 and a grid arc table illustrated in FIG. 10. Shown in FIG. 9 and FIG. 10 is one example of a data structure of data which the grid road combining unit 802 causes the grid road storage unit 3 to store. Other data structure such as one table with the array grid table and the grid arc table combined may be stored in the grid road storage unit 3.

FIG. 9 shows an example of the array grid table. The array grid table is a set of information with indexes (coordinates) in a latitude direction and a longitude direction of each grid as of before the combining processing and a grid ID assigned in the combining processing correlated. In FIG. 9, an array ID indicated with a reference numeral T301 represents indexes in a latitude direction and a longitude direction of each grid as of before the combining processing. Shown in the example shown in FIG. 9 is a position of each grid as of before the processing in the format (longitude direction, latitude direction). In FIG. 9, a grid ID indicated with a reference numeral T302 represents a grid ID assigned by the combining processing. In a case where the common grid ID "G4" is assigned to the grid G (0,0) and (0,1) as shown in FIG. 8, for example, the grid road combining unit 802 correlates G4 with each of the grid coordinates (0,0) and (0,1) (see FIG. 9) and causes the grid road storage unit 3 to store the obtained result. The grid road combining unit 802 correlates an array ID and a grid ID on a grid basis to cause the grid road storage unit 3 to store the result.

FIG. 10 shows an example of the grid arc table. The grid arc table represents a set of information with a grid ID assigned by the combining processing and a set of arcs included in a grid indicated by the grid ID correlated. In FIG. 10, a grid ID indicted with a reference numeral T303 is a grid ID assigned by the combining processing. An arc set T304 is a set of arcs correlated with a grid specified by the grid ID. The grid road combining unit 802 causes the grid road storage unit 3 to store, on a grid ID basis, a combination between a grid ID and a set of arcs correlated with a grid specified by the grid ID. As illustrated in FIG. 8, for example, when a grid ID "G1" is assigned to a grid G(0,5) including the arcs a1 and a2, G1 and {a1,a2} are correlated as shown in the first record in FIG. 10.

Next, the event grid matching unit 401 will be described. FIG. 11 is a diagram for use in explaining an example of a structure of the event grid matching unit 401. The event grid matching unit 401 comprises the event storage unit 40101, a processing target storage unit 40102, a matching processing unit 40103 and a grid event table storage unit 40104.

The event storage unit 40101, which comprises a memory for storing event data time-sequentially sorted by the event collection unit 1, causes the processing target storage unit 40102 to sequentially store the information stored in the memory. The event storage unit 40101 may cause the processing target storage unit 40102 to store the event data stored in the memory at every fixed time interval sequentially in the order of generation time. In addition, when the number of pieces of event data stored in the memory reaches a predetermined number, the event storage unit 40101 may cause the processing target storage unit 40102 to store the event data. The event storage unit 40101 deletes data stored in the processing target storage unit 40102 from the memory that the event storage unit 40101 has. Although illustrated here is a case where event data stored in the event storage unit 40101 is shifted to the processing target storage unit 40102 at every fixed time intervals or on a predetermined number basis, event data may be shifted from the event storage unit 40101 to the processing target storage unit 40102 in other manner.

The processing target storage unit 40102 is a storage device for storing event data to be matched with an arc. Event data temporarily stored in the event storage unit 40101 is sequentially stored in the processing target storage unit 40102.

The matching processing unit 40103 executes processing of correlating all the event data stored in the processing target storage unit 40102 and a grid as of after the combining processing to cause the grid event table storage unit 40104 to store information with event data and a grid correlated. The grid event table storage unit 40104 stores a result of matching processing obtained by the matching processing unit 40103 (the grid event table as a set of information with event date and a grid correlated).

For receiving event data asynchronously with the high-speed map matching unit 4, the event collection unit 1 requires the event storage unit 40101 as a storage unit for adding event data sorted by the event collection unit 1 as occasion arises in the order of generation time and the processing target event storage unit 40102 as a storage unit for use in matching processing. Accordingly, the event grid matching unit 401 has a storage unit in duplicate, the event storage unit 40101 and the processing target event storage unit 40102.

Figures 12, 13:
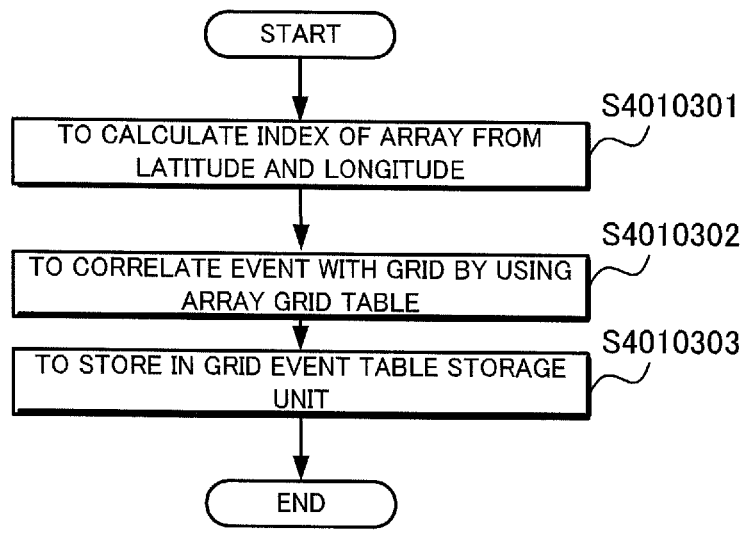
FIG. 12 is a flow chart showing an example of operation of a matching unit.
FIG. 13 is a diagram for use in explaining an example of a grid event table.

FIG. 12 is a flow chart showing an example of operation of the matching unit 40103. The matching unit 40103 executes the following processing with respect to each event data stored in the processing target storage unit 40102 after clearing the grid event table stored in the grid event table storage unit 40104. Assume here that the position T103 is described as a latitude and a longitude in event data.

In addition, FIG. 13 shows an example of the grid event table. In FIG. 13, a grid ID with a reference numeral T4010401 is a grid ID assigned by the combining processing. An event set T4010402 is a set of event IDs of event data to be correlated with the grid ID.

The matching unit 40103 determines to which index in a latitude direction and a longitude direction an event data generation position corresponds from a latitude and a longitude described as the position T103 (see FIG. 2) included in the event data by the following expressions (1) and (2) (Step S4010301).

Index of longitude=making into integer((longitude of event−longitude of origin)/size of a grid in longitude direction)         Expression (1).

Index of latitude=making into integer((latitude of event−latitude of origin)/size of grid in latitude direction)         Expression (2).

Making into an integer in the Expression (1) and the Expression (2) is arithmetic operation of discarding figures below a decimal point to have an integral value. In the Expression (1), "longitude of event" represents a longitude described in event data and "size of grid in longitude direction" represents a division interval in the longitude direction in grid division by the road grid dividing unit 801. Similarly, in the Expression (2), "latitude of event" represents a latitude described in event data and "size of grid in latitude direction" represents a division interval in the latitude direction in grid division by the road grid dividing unit 801.

The matching unit 40103 specifies a grid ID corresponding to a grid with indexes of the latitude and the longitude calculated at Step S4010301 as coordinates from the array grid table stored in the grid road storage unit 3 (Step S4010302). As a result, event data can be correlated with a grid.

Subsequently, the matching unit 40103 searches a grid ID field of the grid event table (see FIG. 13) for a value of a grid ID specified at Step S4010302. When search succeeds, the matching unit 40103 adds, in the grid event table, an event ID of event data to be processed to a set of events in the record of the searched grid ID. When search fails, add a combination between the grid ID specified at Step S4010302 and an event ID of event data correlated with the grid ID to the grid event table stored in the grid event table storage unit 40104 (Step S4010303). When adding an ID of event data to the grid event table, the matching unit 40103 causes the grid event table storage unit 40104 to store the same together with event data specified by the ID.

Figures 14, 15:
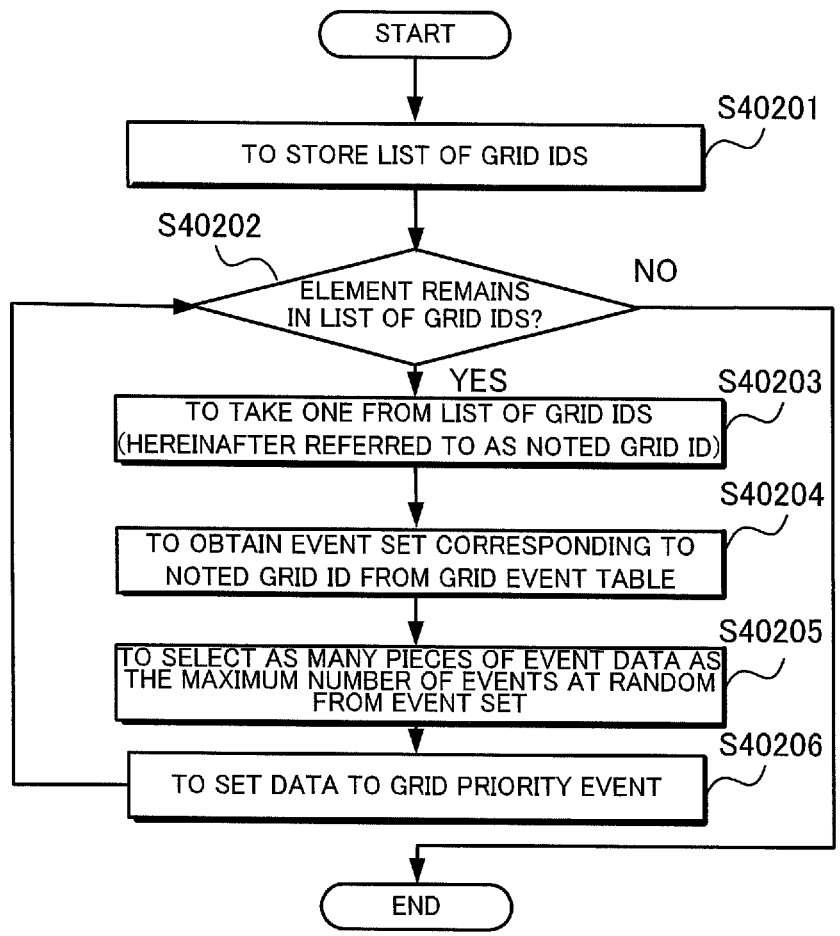
FIG. 14 is a flow chart showing an example of operation of an event processing priority determination unit.
FIG. 15 is a diagram for use in explaining a grid priority event table.

Next, the event processing priority determination unit 402 will be described. FIG. 14 is a flow chart showing an example of operation of the event processing priority determination unit 402. The event processing priority determination unit 402 executes the processing shown in FIG. 14 after the matching unit 40103 executes the processing of Steps S4010301 through S4010303 with respect to each event data.

FIG. 15 shows a grid priority event table obtained by the processing of the event processing priority determination unit 402. Similarly to the grid event table, the grid priority event table is a set of information with event data and a grid correlated with each other. In the grid priority event table, correlated with a grid ID is not more than a predetermined number of pieces of event data selected. Description will be here made of a case where a state of a warning flag is further correlated as an example. Warning flag being off ("0" in this example) represents that an analysis result obtained from a set of events corresponding to a grid ID is reliable. Warning flag being on ("1" in this example) represents that the number of pieces of event data corresponding to a grid ID is short, so that reliability of an analysis result obtained from the event data is low.

The event processing priority determination unit 402 first extracts all the grid IDs (grid ID list) from the grid ID field in the grid event table (see FIG. 13) and stores the extracted grid IDs as a grid ID in the grid priority event table (Step S40201).

The event processing priority determination unit 402 determines whether among the grid IDs extracted at Step S40201, there remains a grid ID (grid ID not selected at Step S40203) yet to be subjected to the processing of Steps S40203 through S40206 (Step S40202). When such a grid ID remains, shift to Step S40203 and otherwise, the event processing priority determination unit 402 ends the processing.

At Step S40203, the event processing priority determination unit 402 selects one of grid IDs which are extracted at Step S40201 and yet to be selected at Step S40203. The event processing priority determination unit 402 may select a grid ID at random from grid IDs yet to be selected. It is also possible to select a grid ID in the order of storage in the grid event table. In the following, a grid ID selected at Step S40203 will be referred to as a noted grid ID whose description will be made.

Next, the event processing priority determination unit 402 extracts an event set corresponding to the noted grid ID from the grid event table (Step S40204).

Subsequently, when the number of pieces of event data belonging to the event set extracted from the grid event table at Step S40204 is larger than the maximum number of events, the event processing priority determination unit 402 selects as many pieces of event data as the maximum number of events from the event set and when the number of pieces of the event data belonging to the event set is not more than the maximum number of events, selects all the event data belonging to the event set (Step S40205). As is already described, the maximum number of events is a threshold value determined in advance for achieving maintenance of an analysis precision and speed-up of matching processing. The larger the number of pieces of event data is at the time of analysis, the more improved the analysis precision is. On the other hand, the larger the number of pieces of event data becomes, the more is time required for processing of matching event data and a road. Event data of vehicles running on the same road, however, is similar in many cases. Accordingly, it can be considered that event data corresponding to one grid (grid as of after the combining processing) is similar as well in many cases, so that the present invention is assumed to extract, when there exist numerous event data corresponding to one noted grid ID, a part of the data and when there exist a small number of pieces of event data, extract all the event data. The maximum number of events is determined as a threshold value for extracting a part of event data existing in abundance. While in the example shown in FIG. 15, the maximum number of events is 2, the maximum number of events may be appropriately determined according to a kind of analysis executed by the event analysis unit 6. When calculating the degree of traffic congestion by the event analysis unit 6, for example, an appropriate number as the maximum number of events is 10.

When the number of pieces of event data belonging to the event set extracted at Step S40204 is larger than the maximum number of events, the event processing priority determination unit 402 may arbitrarily select as many pieces of event data as the maximum number of events from the event set.

In addition, the minimum number of events is a value for determining whether the number of pieces of event data corresponding to a noted grid ID is short or not.

After Step S40205, the event processing priority determination unit 402 adds event data selected at Step S40205 to the grid priority event table so as to be correlated with the noted grid ID. In other words, store the data so as to be correlated with the noted grid ID in the grid priority event table (Step 40206). At this time, when the number of pieces of event data belonging to the event set extracted from the grid event table is less than the minimum number of events, the event processing priority determination unit 402 sets the warning flag corresponding to the noted grid ID to be on ("1") and when the number of pieces of event data is not less than the minimum number of events, sets the warning flag to be off ("0"). Shown in FIG. 15 is an example where with the minimum number of events as 1, the warning flag is constantly set to be on.

Figure 16:
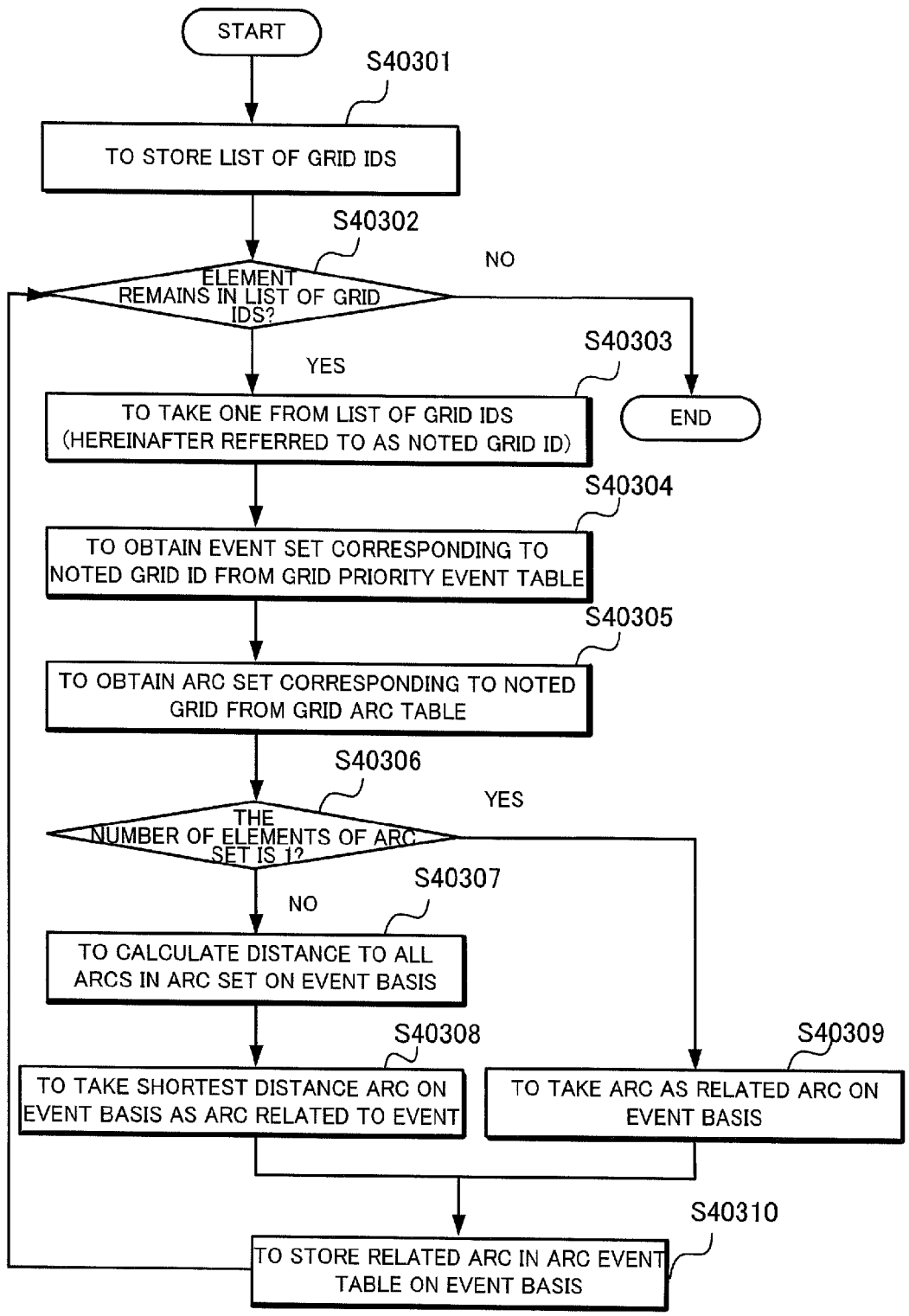
FIG. 16 is a flow chart showing an example of operation of an event road matching unit.

Next, the event road matching unit 403 will be described. FIG. 16 is a flow chart showing an example of operation of the event road matching unit 403. After the grid priority event table (see FIG. 15) is generated by the event processing priority determination unit 402, the event road matching unit 403 executes the processing shown in FIG. 16. The event road matching unit 403 extracts all the grid IDs (grid ID list) from the grid ID field of the grid priority event table (see FIG. 15) and stores the same (Step S40301).

The event road matching unit 403 determines whether among the grid IDs extracted and stored at Step S40301, there remains a grid ID yet to be subjected to the processing of Steps S40303 through S40310 (grid ID not selected at Step S40303) (Step S40302). When such a grid ID remains, shift to Step S40303 and otherwise, the event road matching unit 403 ends the processing.

At Step S40303, the event road matching unit 403 selects one grid ID which is extracted and stored at Step S40301 and which is yet to be selected at Step S40303. The event road matching unit 403 may select a grid ID at random from the grid IDs yet to be selected. The unit may also select a grid ID in the order of storage in the grid priority event table. The grid ID selected at Step S40303 will be refereed to as a noted grid ID whose description will be made in the following.

Next, the event road matching unit 403 extracts a set of events corresponding to the noted grid ID from the grid priority event table (see FIG. 15) (Step S40304). At Step S40304, the event road matching unit 403 searches the grid ID field of the grid priority event table by the value of the noted grid ID to extract a set of events corresponding to the searched grid ID field. Assuming, for example, that the noted grid ID is "G1", the event road matching unit 403 extracts an event set {E11,E12} from the grid priority event table illustrated in FIG. 15. It is assumed that the event road matching unit 403 knows in advance a method of accessing the grid priority event table of the event processing priority determination unit 402.

The event road matching unit 403 extracts a set of arcs corresponding to the noted grid from the grid arc table (see FIG. 10) (Step S40305). At Step 40305, the event road matching unit 403 searches the grid ID field of the grid arc table by the value of the noted grid ID to extract a set of arcs corresponding to the searched grid ID field. Assume, for example, that the noted grid ID is "G1", the event road matching unit 403 extracts an arc set {a1,a2} from the grid arc table illustrated in FIG. 10. It is assumed that the event road matching unit 403 knows in advance a method of accessing the grid arc table of the grid road storage unit 3. Although shown in FIG. 16 is a case where Step S40305 is executed after Step S40304, any of the Steps S40304 and S40305 may be executed first. After executing both processing of Steps S40304 and S40305, shift to Step S40306.

The event road matching unit 403 determines whether a prime number of the arc set extracted at Step S40305 is 1 or not (step S40306). In other words, determine whether the number of arcs belonging to the arc set extracted at Step S40305 is one or not.

When the number of elements of the arc set is plural, that is, when there exist a plurality of arcs in the arc set (no at Step S40306), the event road matching unit 403 calculates a distance between a generation position of event data and every arc belonging to the arc set extracted at Step S40305 on a basis of event data belonging to the event set extracted at Step S40304 (Step S40307). When the noted grid is "G1", for example, the event road matching unit 403 calculates a distance between a generation position of event data whose ID is E11 and which belongs to the event set {E11,E12} and all the arcs a1 and a2 belonging to the arc set {a1,a2}. Similarly, calculate a distance between a generation position of event data whose ID is E12 and the arcs a1 and a2.

When calculating a distance between an event data generation position and an arc, since event data generation occurs at one point and the arc is a line segment, the event road matching unit 403 only needs to calculate a length of a perpendicular obtained by drawing a perpendicular from the event data generation position to the arc.

The event road matching unit 403 only needs to calculate a distance between an event data generation position and an arc by the following manner, for example. In the following calculation, assume that an axis in the longitude direction is the x-axis, an axis in the latitude direction is the y-axis, and the longitude represents the x-coordinate and the latitude represents the y-coordinate. The event road matching unit 403 accesses the arc information table (see FIG. 3) of the road network storage unit 2 to read node IDs of nodes as a start point and an end point of the arc. The event road matching unit 403 further accesses the node information table (see FIG. 4) of the road network storage unit 2 to read a latitude and a longitude correlated with the node IDs of the arc start point and end point. Assume that coordinates of the node as the start point are (x1,y2) and coordinates of the node as the end point are (x2,y2). x1 and x2 represent longitudes of the nodes and y1 and y2 represent latitudes of the nodes. With an inclination of a straight line passing these two nodes as m, m can be obtained by the following Expression (3).

$$m=(y1-y2)/(x1-x2) \quad \text{Expression (3)}$$

With an intercept of a straight line passing the two nodes as n, n can be obtained by the following Expression (4).

$$n=-m \cdot x1+y1 \quad \text{Expression (4)}$$

Further assume that an event data generation position is (x0,y0). x0 represents a longitude described as a generation position in event data and y0 represents a latitude described as a generation position in event data. At this time, a distance d as a distance between an event data generation position and an arc is obtained by the following Expression (5) by using the above-described inclination m and the intercept n.

$$d=|y0-m \cdot x0-n|/\sqrt{(1+m2)} \quad \text{Expression (5)}$$

The event road matching unit 403 accordingly only needs to calculate m from the latitudes and the longitudes of the arc start and end points by the Expression (3) and further calculate n by the Expression (4) to calculate the distance d from the calculated m and n and the event data generation position (x0,y0) by the Expression (5).

The event road matching unit 403 specifies an arc whose distance calculated at Step S40307 is the shortest with respect to each event data belonging to the event set calculated at Step S40304 (Step S40308). Arc determined to have the shortest distance from the event data generation position at Step S40303 will be referred to as a related arc of the event. Specify a related arc on a basis of each event data belonging to the event set extracted at Step S40304. Related arc denotes a road on which event data is generated.

When the number of elements of the set of arcs extracted at Step S40305 is one, that is, when there exists only one arc in the arc set (yes at Step S40306), the event road matching unit 403 determines the arc to be a related arc of each event data belonging to the event set extracted at Step S40304 (Step S40309).

Figure 17:
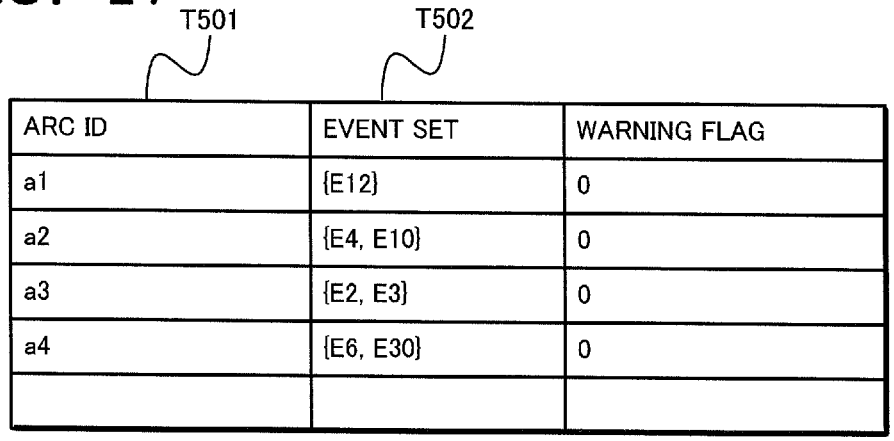
FIG. 17 is a diagram for use in explaining an example of an arc event table.

After Step S40308 and Step S40309, the event road matching unit 403 adds information indicative of a correspondence relationship between event data and an arc to the arc event table (Step S40310). FIG. 17 is a diagram for use in explaining an example of an arc event table. The arc event table is a set of information correlating an arc and a set of event data having the arc as a related arc. Description will be here made, as an example, of a case where a state of a warning flag is further correlated. In FIG. 17, an arc ID indicated with a reference numeral T501 is an arc ID of an arc considered as a related arc at Step S40308 or Step S40309. An event set T502 is a set of event data having an arc specified by the arc ID as a related arc.

At Step S40310, the event road matching unit 403 searches the arc ID field of the arc event table for an arc ID of the arc determined as a related arc at Step S40308 or Step S40309. When the search succeeds, the event road matching unit 403 adds an ID of event data having the arc as a related arc to an event set in a record of the searched arc ID. When the search fails, newly add a combination between an event ID and an arc ID of a related arc of the event data to the arc event table.

The event road matching unit 403 causes the event road storage unit 5 to store the arc event table. For adding an arc ID or an ID of event data belonging to the event set to the arc event table at Step S40310, addition is made to the arc event table of the event road storage unit 5. When adding an ID of event data to the arc event table, the event road matching unit 403 causes the event road storage unit 5 to store the ID together with event data specified by the ID.

In addition, when among event sets corresponding to the arc ID, there exists an event set coincident with an event set whose warning flag is on ("1") in the grid priority event table, the event road matching unit 403 sets a warning flag corresponding to the arc ID to be on ("1").

Next, description will be made of the event analysis unit 6. The arc event table stored in the event road storage unit 5 correlates a road (arc) and event data generated on the road. The event analysis unit 6 refers to the arc event table stored in the event road storage unit 5 to execute analysis related to a traffic condition. The event analysis unit 6 only needs to refer to the arc event table stored in the event road storage unit 5, extract an event set corresponding to the arc ID and read event data specified by the ID of event data belonging to the event set to make analysis by using the event data.

When determining the degree of traffic congestion on a road basis, for example, the event analysis unit 6 only needs to read event data of each arc ID in the arc event table and calculate a mean value of a speed described in the event data to determine the degree of traffic congestion according to a mean value on an arc ID basis. As a range of speed, with a range between not less than 0 and less than V1, a range between not less than V1 and less than V2 and a range not less than V2 determined, when an average speed of an arc is not less than 0 and less than V1, determination may be made that the degree of traffic congestion is "high", when the average speed is not less than V1 and less than V2, determination may be made that the degree of traffic congestion is "medium" and when the average speed is not less than V2, determination may be made that the degree of traffic congestion is "low". The event analysis unit 6 calculates a mean value of a speed on an arc basis to determine a degree of traffic congestion on an arc basis.

Among other manners of analysis by the event analysis unit 6 is arrival time estimation. The event analysis unit 6, similarly to a case of determining a degree of traffic congestion, calculates a mean value of a speed described in event data on an arc ID basis. When a manager of the map matching system designates vehicle departure point and arrival point, for example, the event analysis unit 6 searches the arc information table and the node information table stored in the road network storage unit 2 for a set of arcs from the departure point to the arrival point. The event analysis unit 6 calculates a length of an arc (a distance between a start point and an end point of each arc) on a basis of an arc included in the set of arcs searched. At this time, access the arc information table stored in the road network storage unit 2 to read a node ID of a node as a start point and a node as an end point of each arc ID and access the node information table stored in the road network storage unit 2 to read a latitude and a longitude corresponding to the node ID. Then, with a latitude and a longitude of a node as a start point and a node as an end point as coordinates, it is only necessary to calculate a distance between the two points. For each arc included in the searched set of arcs, the event analysis unit 6 further calculates a time required for a vehicle to pass through the arc by dividing a length of the arc by a mean value of a speed and calculates a sum of the passing times. The sum will be a traveling time from the designated departure point to the designated arrival point. The event analysis unit 6 considers a time obtained by adding the traveling time to the current time as an estimated arrival time. The processing of searching a set of arcs from a departure point to an arrival point may be executed by other device than the event analysis unit 6.

It is also possible in arrival time estimation to cluster event data into two classes on an arc basis and calculate a highest traveling time and a worst traveling time to have a margin of an estimated traveling time. When event data is clustered into two classes, the event analysis unit 6 only needs to classify, after calculating a mean value of a speed on an arc basis, for example, event data into a class of event data with a speed higher than the mean value described and a class of event data with a speed lower than the mean value described. It is also possible to cluster event data into two classes by the K-averaging method. The event analysis unit 6 calculates a mean value of a speed in each event data with a speed higher than the mean value described to calculate a traveling time from a departure point to an arrival point or an estimated arrival time by using the mean value similarly to the above-described case. This time is the highest traveling time. Similarly, the event analysis unit 6 calculates a mean value of a speed in each event data with a speed lower than the mean value described to calculate a traveling time from a departure point to an arrival point or an estimated arrival time by using the mean value in the same manner as that of the above case. This time is the worst traveling time.

Among other manners of analysis by the event analysis unit 6 is traveling time variation detection. The event analysis unit 6 stores an average speed calculated for each arc in the storage device as a history on a fixed time basis. The fixed time is arbitrarily set by a manager, for example. It may be thirty minutes or one day, for example. The event analysis unit 6 calculates a mean value of an average speed (history average speed) stored as a history on an arc basis and when a new average speed for each arc is calculated, calculates a difference in a history average speed. When the difference is larger than a threshold value, the unit causes the analysis result output unit 7 to display a warning.

The event analysis unit 6 causes the analysis result output unit 7 to output an analysis result. When determination on a degree of traffic congestion is made, for example, the event analysis unit 6 overlaps a road network on a map to cause the analysis result output unit 7 to display an image differently colored according to the degree of traffic congestion. This display enables a manager to confirm the analysis result. In addition, when in the arc event table (see FIG. 17), there exists an arc whose warning flag is on ("1"), the event analysis unit 6 causes the analysis result output unit 7 to display the arc distinguishably from other arc. This display enables the manager to recognize an arc (road) whose analysis result reliability is low because of a small number of pieces of event data.

Figure 18:
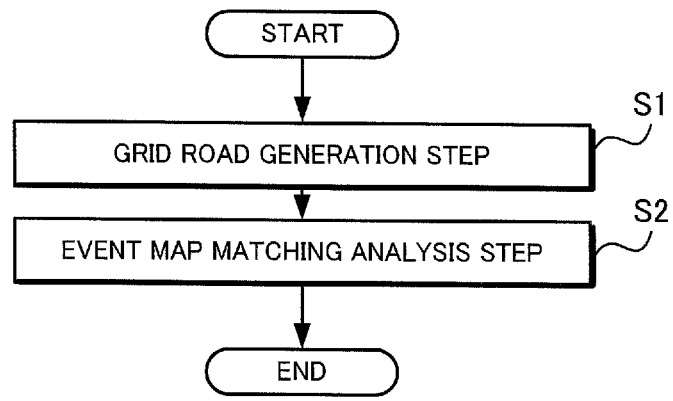
FIG. 18 is a diagram for use in explaining operation of an entire map matching system.

Next, operation of the entire map matching system will be described. FIG. 18 is a diagram for use in explaining operation of the entire map matching system. The map matching system executes processing of causing the grid road storage unit 3 to store a correspondence relationship among an arc, a grid as of before the combining processing and a grid as of after the combining processing (the grid road generation step: Step S1). Then, with reference to the information stored in the grid road storage unit 3, execute processing of making analysis by executing map matching with respect to event data collected by the event collection unit 1 (the event map matching analysis step: Step S2). Step S1 is preprocessing of Step S2 and once Step S1 is executed, unless data of the road network stored in the road network storage unit 2 is changed, another execution of Step S1 is not required.

Step S1 is executed by the grid road generation unit 8. Step S2 is executed by the event collection unit 1, the high-speed map matching unit 4, the event road storage unit 5, the event analysis unit 6 and the analysis result output unit 7. The grid road generation unit 8 which executes Step S1 as the preprocessing is a back-end. The event collection unit 1, the high-speed map matching unit 4, the event road storage unit 5, the event analysis unit 6 and the analysis result output unit 7 which execute processing with respect to event data received as occasion arises are front-ends. The grid road storage unit 3 stores information generated by the back-end. This information is referred to by the front-end.

Figure 19:
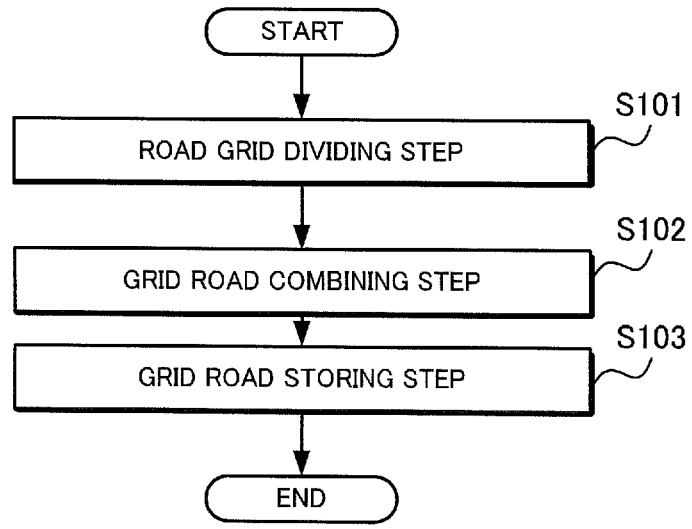
FIG. 19 is a flow chart showing operation of a grid road generating step.

FIG. 19 is a flow chart showing operation of Step S1 (grid road generation step). At Step S1, the road grid dividing unit 801 derives each grid which is obtained by dividing a region of a road network indicated by the arc information table and the node information table stored in the road network storage unit 2 into a latitude direction and a longitude direction by an equal space (the road grid division step: Step S101). At Step S101, the road grid dividing unit 801 sequentially assigns an index starting with 0 within a latitude direction division range and similarly assigns an index sequentially starting with 0 within a longitude direction division range. The road grid dividing unit 801 furthermore specifies a set of arcs crossing a grid to correlate the grid and the arc.

After Step S101, the grid road combining unit 802 executes combining processing with respect to data having the grid and the arc correlated which is generated by the road grid dividing unit 801 (the grid road combination step: Step S102). Thereafter, the grid road combining unit 802 causes the grid road storage unit 3 to store a correspondence relationship among an arc, a grid as of before the combining processing and a grid as of after the combining processing (the grid road storage step: Step S103). The grid road combining unit 802, for example, causes the grid road storage unit 3 to store the array grid table shown in FIG. 9 and the grid arc table shown in FIG. 10.

Details of the operation of the above-described road grid dividing unit 801 and the grid road combining unit 802 are as already described.

Figures 20, 21:
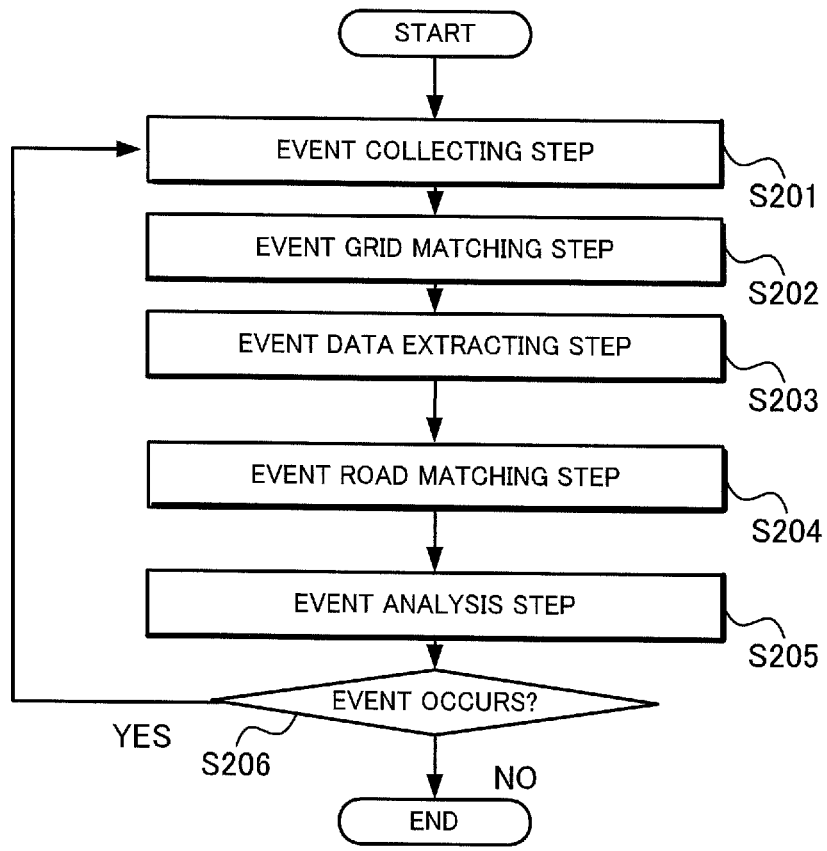
FIG. 20 is a flow chart showing operation of an event map matching analyzing step.
FIG. 21 is a diagram for use in explaining an example of an arc event table with event data correlated on a basis of each of "up" and "down" attributes of each arc.

FIG. 20 is a flow chart showing operation of Step S2 (the event map matching analysis step). Step S2 is processing with respect to event data received as occasion arises and when the processing of Step S2 is executed, the grid road generation unit 8 as a back-end refrains from operating and only the front-end operates.

At Step S2, the event collection unit 1 receives event data generated by a vehicle through a base station (the event collection step: Step S201). There exist numerous vehicles and the event collection unit 1 receives event data transmitted by each vehicle.

The event grid matching unit 401 correlates the event data received by the event collection unit 1 and the grid as of after the combining processing to specify a set of event data corresponding to each grid as of after the combining processing (the event grid matching step: Step S202). In other words, the unit derives a grid event table (see FIG. 13).

Subsequently, when the number of pieces of event data correlated with the grid as of after the combining processing is larger than the maximum number of events, the event processing priority determination unit 402 extracts as many pieces of event data as the maximum number of events from the event data and when the number of pieces of event data correlated with the grid as of after the combining processing is not more than the maximum number of events, extracts all the event data correlated with the grid (the event data extraction step: Step S203).

With respect to all the event data extracted at Step S203, the event road matching unit 403 calculates a distance between a road in a grid correlated with the event data and a generation position of the event data to specify on which road a vehicle runs that generates the event data (the event road matching step: Step S204). In other words, the arc event table is derived (see FIG. 17).

Subsequently, the event analysis unit 6 refers to the arc event table to execute analysis such as determination of a degree of traffic congestion of a road based on event data correlated on a road basis (the event analysis step: Step S205). Kind of analysis made by the event analysis unit 6 is not limited in particular.

According to the present invention, the road grid dividing unit 801 derives a grid which is obtained by dividing a region where a road network exists by an equal space in the latitude direction and the longitude direction and the grid road combining unit 802 assigns the same grid ID to a plurality of grids which are adjacent to each other and whose sets of roads correlated with the grid are coincident. Then, when deriving the arc event table, execute processing on a basis of a grid ID as of after the combining processing. Thus executing the combining processing enables the amount of processing to be reduced to enable processing of correlating event data and an arc to be executed at a high speed. More specifically, execution of the combining processing by the grid road combining unit 802 leads to a less number of repetitions of the loop processing starting at Step S40302 shown in FIG. 16, so that the processing of deriving an arc event table can be executed at a high speed.

In addition, event data of vehicles running on the same road is similar in many cases. Therefore, through the combining processing by the grid road combining unit 802, by making up a range in which sets of roads coincide with each other to specify event data corresponding to the range, numbers of pieces of similar event data can be correlated with the range in which sets of road are coincident. Then, when such event data exists as many as not less than a threshold value (the maximum number of events), extracting a part of such event data to correlate the data with a road and then making analysis enables an analysis precision to be maintained and speed-up of the processing to be realized with a processing load reduced. More specifically, the processing of deriving an arc event table can be executed at a high speed with an amount of processing of Steps S40307, S40308 and S40309 (see FIG. 16) reduced.

In the present invention, the front-ends (the event collection unit 1, the high-speed map matching unit 4, the event road storage unit 5, the event analysis unit 6 and the analysis result output unit 7) operate independently of the preprocessing by the back-end (the grid road generation unit 8). It is therefore possible for the front-end to execute the processing at a high speed as described above irrespective of the amount of processing in the preprocessing.

Even when a road network as an event data collection target is widen or when the number of vehicles which transmit event data is increased, the present invention enables high-speed processing as described above. In other words, the present invention has scalability for a width of a road network or the number of vehicles from which event data is to be collected.

In addition, since an object of an analysis using a processing result of the event road matching unit 403 is not limited, the present invention can be used for a general-purpose analysis.

As described in the foregoing, the present invention enables the arc event table with event data and a road correlated to be derived at a high speed. In addition, since event data to be applied to the present invention includes an ID, generation time and date of event data, a generation position and a vehicle speed at the generation, various analyses can be executed such as determination on a degree of traffic congestion, estimation of an arrival time and traveling time variation detection.

In addition, in the present invention, a road to be stored as an arc in the road network storage unit is not limited to a main road and even a narrow road can be determined as an arc. It is accordingly possible to make event data generated not only by a main road but also by a narrow road be an analysis target by correlating them with an arc without distinguishing a kind of road.

While shown in the foregoing description is a case where when the number of pieces of event data correlated with a grid as of after the combining processing is less than the minimum number of events, the processing of turning on the warning flag is executed, no comparison between the number of pieces of event data correlated with a grid and the minimum number of events is required. In other words, the minimum number of events needs not to be determined in the present invention. In this case, no warning flag is used. Accordingly, when the event analysis unit 6 causes the analysis result output unit 7 to display an analysis result, it is unnecessary to distinguishably display a road based on a warning flag.

In addition, when event data includes a vehicle forwarding direction, the event road matching unit 403, at the time of generating an arc event table, may add attributes "up" and "down" to each arc to correlate the event data with either the "up" or "down". Direction described in event data correlated with one arc is either one of two directions which are reverse to each other. When a direction described in event data is one of the two directions, the data may be correlated with the "up" of the arc, for example. Event data in which its reverse direction is described may be correlated with the "down" of the arc. FIG. 21 shows an example of an arc event table in which event data is correlated with each attribute of "up" and "down" of each arc. In FIG. 21, a warning flag field is omitted. In addition, when thus deriving an arc event table, at the time of selecting as many pieces of event data as the maximum number of events from more pieces of event data than the maximum number of events at Step S40205 (see FIG. 14), it is preferable to select event data such that the number of pieces of event data in which one direction is described and the number of pieces of event data in which its reverse direction is described become as approximate as possible. Alternatively, similarly to the already described case, event data may be arbitrarily selected. When the arc event data shown in FIG. 21 is generated, the event analysis unit 6 executes individual analysis with respect to "up" and "down" of an arc.

On the other hand, when event data includes a wiper use situation, the event analysis unit 6 may determine whether a vicinity of a road has a rainfall or not. In other words, when among event data corresponding to an arc ID, event data having a description representing "in use" in the wiper use situation exits more than a predetermined number, determination may be made that it is raining in the vicinity of the arc.

Similarly, when event data includes a brake use situation, the event analysis unit 6 may determine a degree of traffic congestion based on the brake use situation. In other words, when among event data corresponding to an arc ID, event data having a description representing "in use" in the brake use situation exits more than a predetermined number, determination may be made that the arc is in the traffic congestion.

Determination can be also made that an accident might occur in place of determining that it is in the traffic congestion.

Second Exemplary Embodiment

Figure 22:
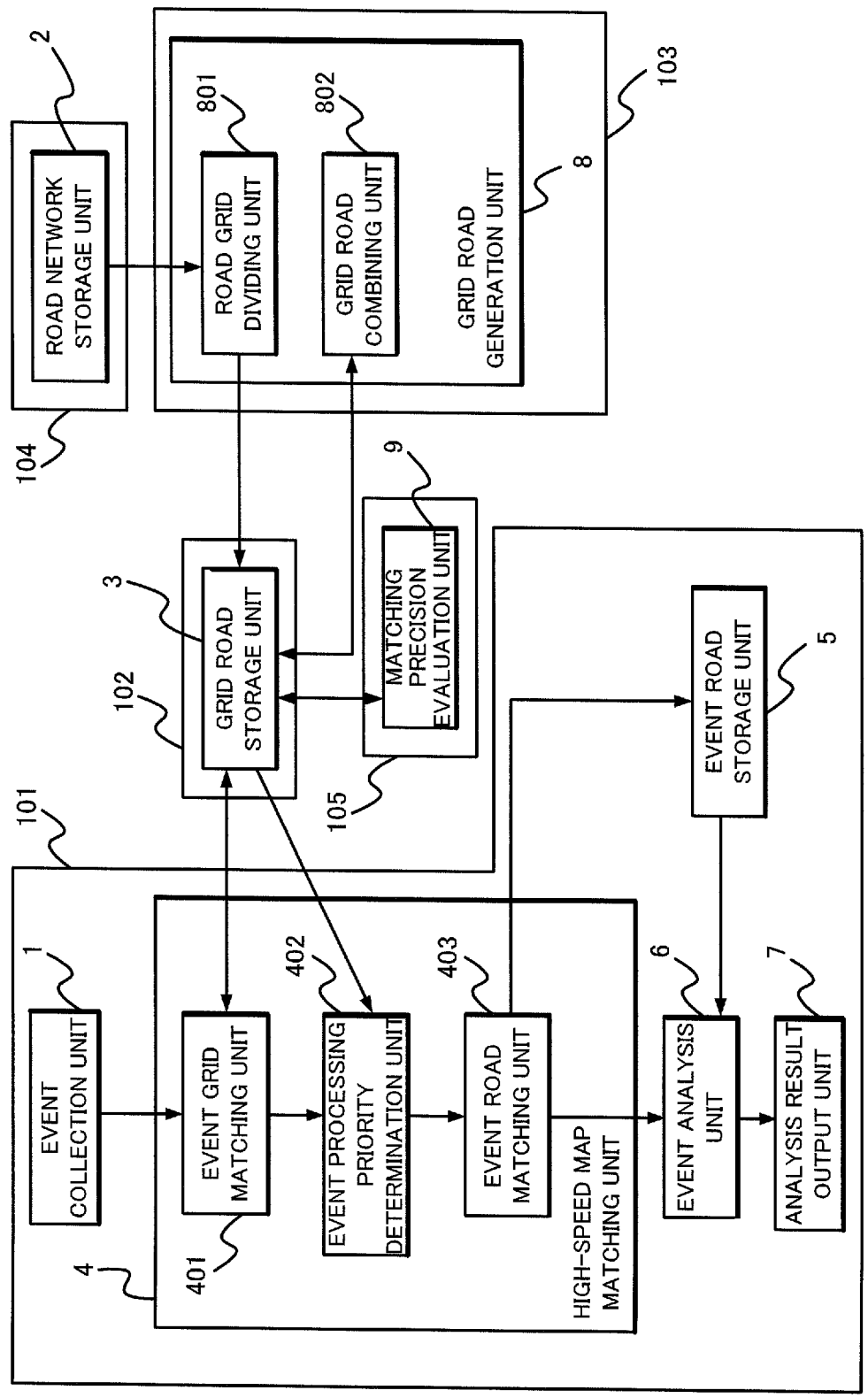
FIG. 22 is a block diagram showing an example of a second exemplary embodiment according to the present invention.

FIG. 22 is a block diagram showing an example of a second exemplary embodiment of the present invention. To the same components as those of the first exemplary embodiment, the same reference numerals as those in FIG. 1 are given to omit their description. A map matching system according to the second exemplary embodiment comprises a matching precision evaluation device 105 having a matching precision evaluation unit 9. The matching precision evaluation unit 9 determines a maximum number of events and a minimum number of events on a grid basis according to the number of arcs correlated with a grid.

The matching precision evaluation unit 9 is realized, for example, by a CPU operable according to a program.

The matching precision evaluation unit 9 may be provided in the map matching device 101 or the road data generation device 103. When the matching precision evaluation unit 9 is provided in the map matching device 101, the matching precision evaluation unit 9 and the high-speed map matching unit 4 are realized by the same CPU operable according to a map matching program. In addition, the road data storage device 102, the road network storage device 104 and the matching precision evaluation device 105 may be realized by the same device. Alternatively, each unit can be provided all in the same device. Thus, a structure of the map matching system according to the second exemplary embodiment is not limited to the structure shown in FIG. 22.

The matching precision evaluation unit 9 refers to the grid arc table stored in the grid road storage unit 3 by the grid road combining unit 802. Then, the matching precision evaluation unit 9 determines a maximum number of events and a minimum number of events according to the number of arcs correlated with a grid. The matching precision evaluation unit 9 executes the processing on a grid basis.

The matching precision evaluation unit 9 determines a minimum number of events and a maximum number of events to be a larger value for each grid ID in the grid arc table as the number of arcs is increased while satisfying that "the minimum number of events" is smaller than "the maximum number of events". The matching precision evaluation unit 9 may determine the minimum number of events to be the same as the number of arcs and the maximum number of events to be double the number of arcs, for example. This calculation of the minimum number of events and the maximum number of events is one example only and the minimum number of events and the maximum number of events may be determined on a grid ID basis by other calculation. Any calculation is possible for the minimum number of events and the maximum number of events by determining a minimum number of events and a maximum number of events to be a larger value as the number of arcs corresponding to a grid (grid as of after the combining processing) is increased while satisfying that "the minimum number of events" is smaller than "the maximum number of events".

Figure 23:
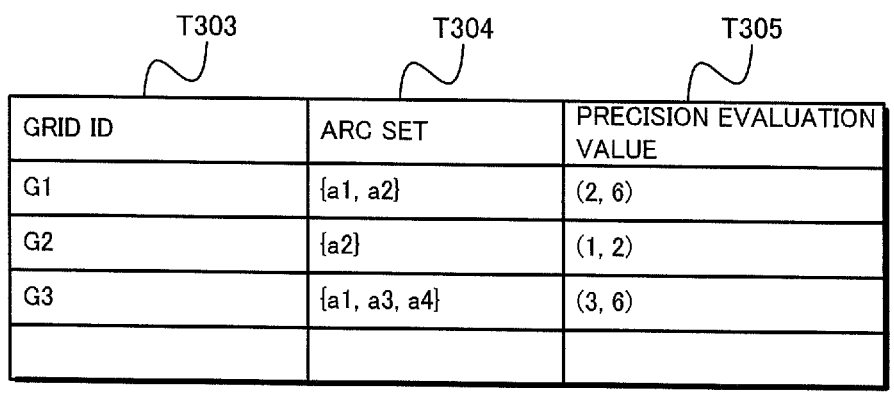
FIG. 23 is a diagram for use in explaining an example of a grid arc table with the minimum number of events and the maximum number of events added.

The matching precision evaluation unit 9 causes the grid road storage unit 3 to store the minimum number of events and the maximum number of events determined for each grid ID so as to be correlated with the grid ID. Add, for example, the minimum number of events and the maximum number of events to the grid arc table. FIG. 23 shows an example of the grid arc table to which the minimum number of events and the maximum number of events are added. The grid IDs and the set of arcs shown in FIG. 23 are the same as those of the grid arc table described in the first exemplary embodiment (see FIG. 10). A precision evaluation value T305 represents the minimum number of events and the maximum number of events. Although shown in FIG. 23 is a case where the minimum number of events and the maximum number of events are described in a format "(the minimum number of events, the maximum number of events)", a format for describing the minimum number of events and the maximum number of events may be other format.

Before executing processing of Step S40205 (see FIG. 14), the event processing priority determination unit 402 accesses the grid road storage unit 3 to read the minimum number of events and the maximum number of events corresponding to a noted grid ID. Then, by using the maximum number of events, execute the processing of Step S40205. In addition, the event processing priority determination unit 402 determines whether a warning flag is set to be on or off by using the minimum number of events.

Remaining operation is the same as that of the first exemplary embodiment.

In general, it is considered that the more the number of arcs is, the more required is the number of pieces of event data necessary for analysis. Since in the present exemplary embodiment, the larger the number of arcs corresponding to a grid becomes, the larger determined is a value as the minimum number of events and the maximum number of events, event data can be analyzed with high precision.

Third Exemplary Embodiment

Figure 24:
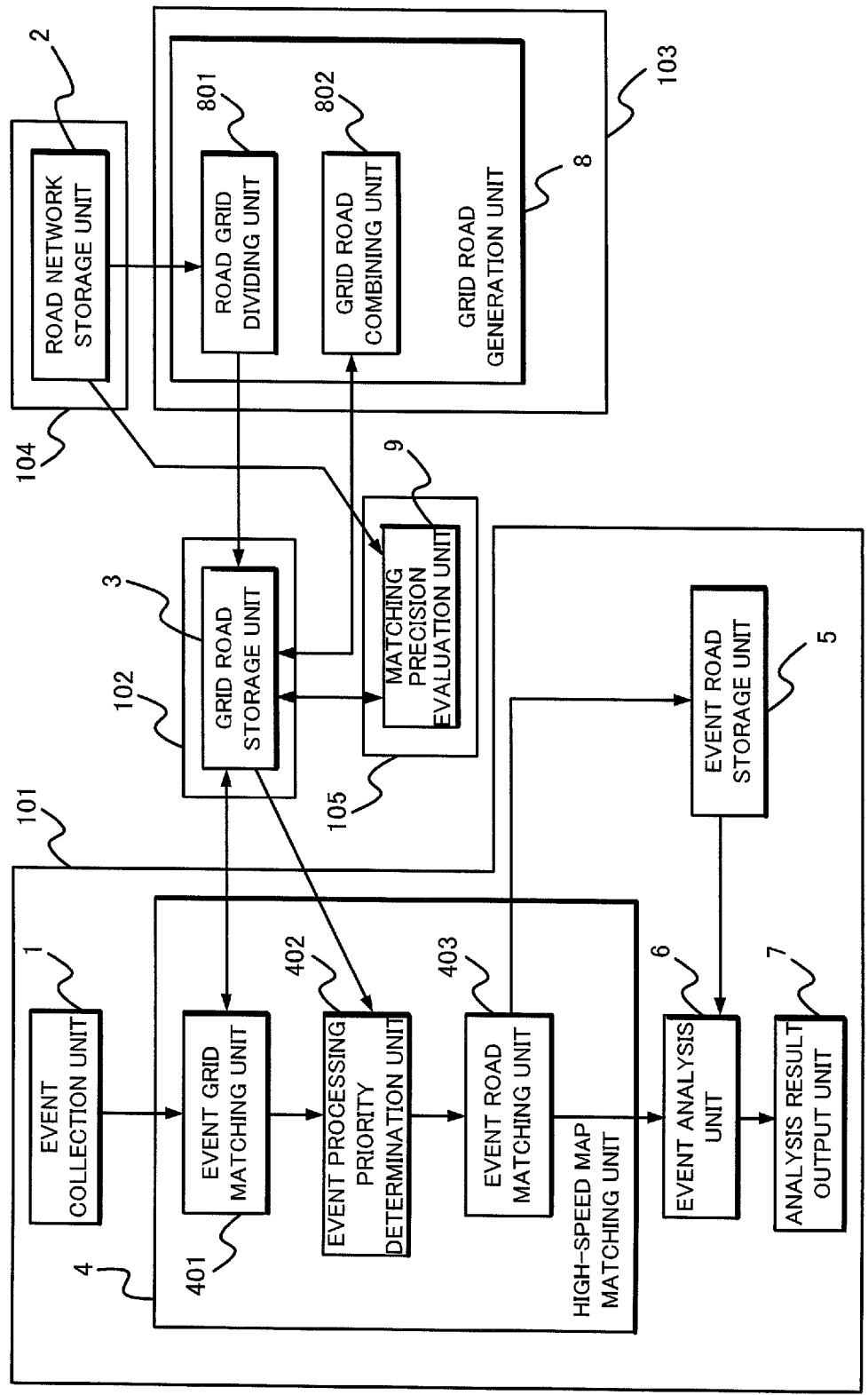
FIG. 24 is a block diagram showing an example of a third exemplary embodiment according to the present invention.

FIG. 24 is a block diagram showing an example of a third exemplary embodiment of the present invention. The same components as those of the first exemplary embodiment and the second exemplary embodiment are given the same reference numerals as those in FIG. 1 and FIG. 22 to omit their description. In the present exemplary embodiment, however, operation of the matching precision evaluation unit 9 differs from that of the second exemplary embodiment. The matching precision evaluation device 105 that has the matching precision evaluation unit 9 needs not to be a separate device from other device. This is the same as in the second exemplary embodiment. The matching precision evaluation unit 9 may be provided in the map matching device 101, for example. In this case, the matching precision evaluation unit 9 and the high-speed map matching unit 4 are realized by the same CPU operable according to the map matching program.

The grid road combining unit 802 according to the present exemplary embodiment includes in the grid arc table, together with a grid ID, a latitude and a longitude in a grid as of after the combining processing at opposite ends of each side of the grid as a boundary with other grid.

The matching precision evaluation unit 9 according to the present exemplary embodiment determines a maximum number of events and a minimum number of events on a grid basis according to a total sum of lengths of arcs passing the grid. This operation may be executed by a following manner, for example. The matching precision evaluation unit 9 refers to the grid arc table to select one grid ID and reads each arc ID corresponding to the grid ID. Then, read an array ID corresponding to the grid ID from the array grid table. The matching precision evaluation unit 9 further searches a node which will be a start point or an end point of each arc corresponding to the grid ID and which belongs to a grid indicated by the grid ID. Node which will be a start point or an end point of each arc corresponding to the grid ID is specified by accessing the arc information table (see FIG. 3) stored in the road network storage unit 2. The node latitude and longitude are specified by accessing the node information table (see FIG. 4) stored in the road network storage unit 2.

Execute the same calculation as that in the Expression (1) and the Expression (2) with an event longitude and an event latitude in the Expression (1) and the Expression (2) replaced by a latitude and a longitude at a node as a start point or an end point of an arc. When a combination between an index of the latitude and an index of the longitude obtained as a result coincides with an array ID corresponding to the selected grid ID, determination is made that the node is a node which will be a start point or an end point of each arc corresponding to the grid ID and which belongs to a grid indicated by the grid ID.

Figure 25:
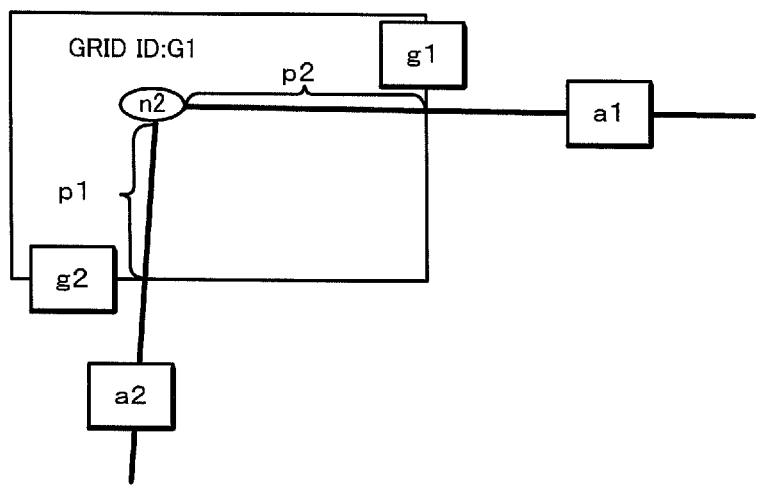
FIG. 25 is a diagram for use in explaining an example of a node in a grid and an arc extending from the node.

By using a latitude and a longitude at opposite ends of each arc having the searched node as a start point or an end point and a latitude and a longitude at opposite ends of a side of a grid indicated by the selected grid ID, the matching precision evaluation unit 9 obtains a latitude and a longitude of a crossing between an arc extending from the searched node and the side of the grid indicated by the selected grid ID. FIG. 25 is a diagram for use in explaining an example of a node searched in a grid indicated by a selected grid ID and an arc extending from the node. A node n2 shown in FIG. 25 is a node which will be a start point or an end point of each arc corresponding to a grid ID and a node searched as a node belonging to a grid indicated by the grid ID. Shown here is a case where G1 is selected as a grid ID. The matching precision evaluation unit 9 reads a latitude and a longitude at opposite end points of an arc a1 with the node n2 as a start point or an end point from the road network storage unit 2. The matching precision evaluation unit 9 reads a latitude and a longitude at the opposite end points of a side g1 of the grid indicated by the grid ID from the grid arc table to calculate a latitude and a longitude at a crossing between the arc a1 and the side g1. The matching precision evaluation unit 9 only needs to calculate an equation of a straight line including the arc a1 from the latitude and the longitude at the opposite end points of the arc a1 and similarly calculate an equation of a straight line including the side g1 from the latitude and the longitude at the opposite end points of the side g1 to calculate a latitude and a longitude at a crossing between a1 and g1 as a crossing between the two straight lines. Then, the matching precision evaluation unit 9 calculates a distance p1 between the crossing and the node n2. Also as to other arc a2 extending from n2, the matching precision evaluation unit 9 obtains a distance p2 between a crossing between the arc a2 and a side g2 and the n2. By calculating a sum of thus obtained distance between the node n2 and a crossing between an arc extending from the node n2 and a side, obtain a total sum of lengths of arcs passing within the grid.

The matching precision evaluation unit 9 refers to the grid arc table to sequentially select an individual grid ID and execute the above processing on a grid ID basis.

When a total sum of lengths of arcs passing within the grid is obtained, the matching precision evaluation unit 9 determines a maximum number of events and a minimum number of events according to the total sum of the lengths of arcs in the grid. This determination is made also on a grid basis.

The matching precision evaluation unit 9 determines a minimum number of events and a maximum number of events to be a larger value as a total sum of lengths of arcs passing within the grid is increased while satisfying that "the minimum number of events" is smaller than "the maximum number of events". For example, as a value proportional to a total sum of lengths of arcs, the minimum number of events and the maximum number of events may be determined on a grid ID basis. Calculation of a minimum number of events and a maximum number of events is one example and a minimum number of events and a maximum number of events may be determined on a grid ID basis by other calculation. Any calculation is possible for a minimum number of events and a maximum number events as long as a minimum number of events and a maximum number of events are set to be a larger value as a total sum of lengths of arcs passing a grid (grid as of after the combining processing) is increased while satisfying that "the minimum number of events" is smaller than "the maximum number of events".

The matching precision evaluation unit 9, similarly to the second exemplary embodiment, adds the minimum number of events and the maximum number of events to the grid arc table. In addition, operation of the event processing priority determination unit 402 is the same as that of the second exemplary embodiment. More specifically, before executing the processing of Step S40205 (see FIG. 14), access the grid road storage unit 3 to read the minimum number of events and the maximum number of events corresponding to a noted grid ID. Then, by using the maximum number of events, execute the processing of Step S40205. Determination whether a warning flag is set to be on or off is also made by using the minimum number of events.

It is considered that the longer the length of an arc passing within a grid becomes, the more required is the number of pieces of event data necessary for analysis. Since in the present exemplary embodiment, the larger the total sum of lengths of arcs is, the larger a value is determined as the minimum number of events and the maximum number of events, event data can be analyzed with high precision.

Fourth Exemplary Embodiment

Figure 26:
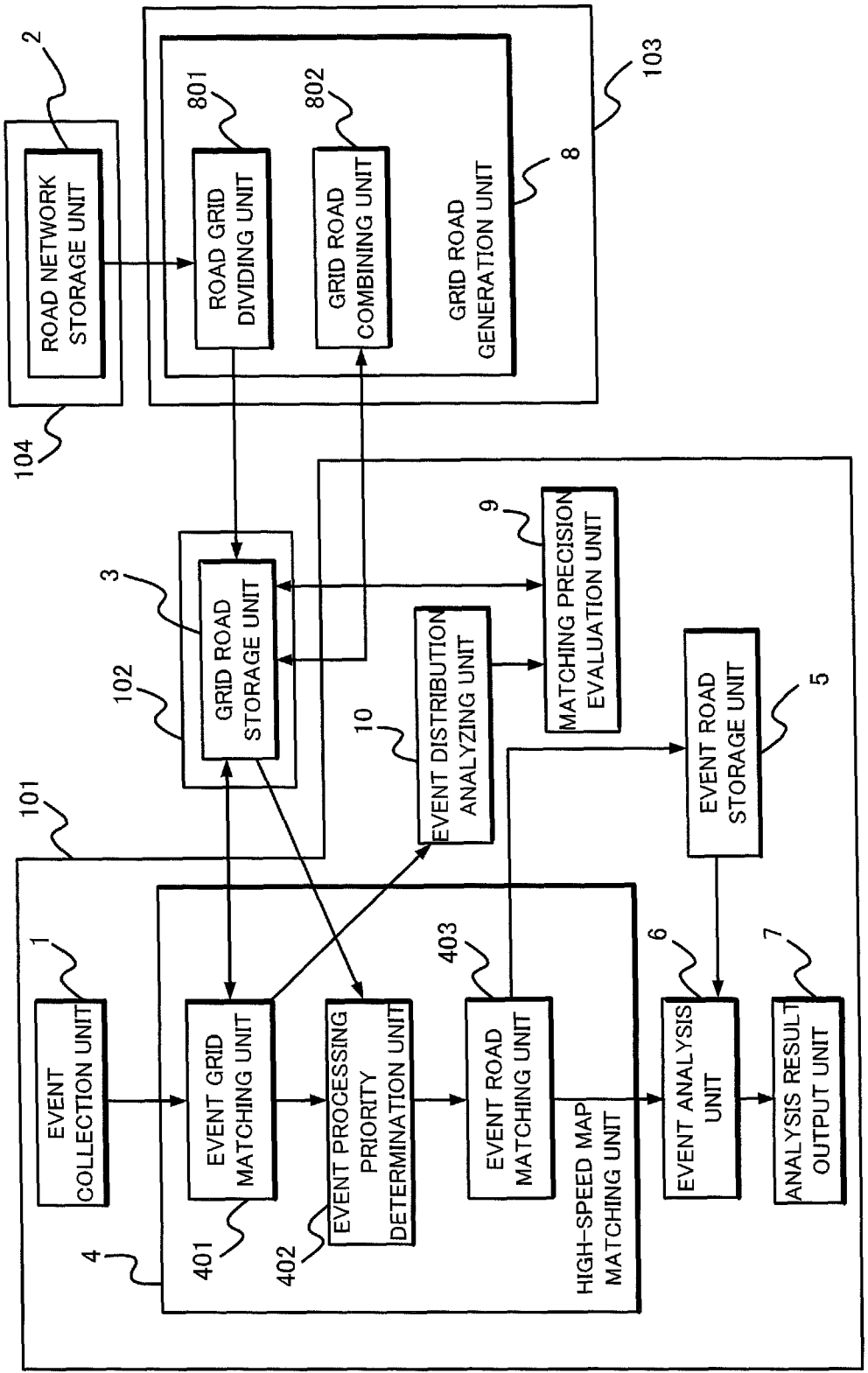
FIG. 26 is a block diagram showing an example of a fourth exemplary embodiment according to the present invention.

FIG. 26 is a block diagram showing an example of a fourth exemplary embodiment of the present invention. The same components as those of the first exemplary embodiment and the second exemplary embodiment are given the same reference numerals as those in FIG. 1 and FIG. 22 to omit their description. In the present exemplary embodiment, however, operation of the matching precision evaluation unit 9 differs from that of the second exemplary embodiment. In the following, it is assumed in the fourth exemplary embodiment that the event analysis unit 6 executes such analysis using a speed included in event data as determination of a degree of traffic congestion.

In the present exemplary embodiment, while the matching precision evaluation unit 9 is preferably provided in the map matching device 101, it can be provided in other device. When the matching precision evaluation unit 9 is provided in the map matching device 101, the matching precision evaluation unit 9, the high-speed map matching unit 4 and an event distribution analyzing unit 10 are realized by the same CPU operable according to the map matching program.

The map matching device 101 according to the present exemplary embodiment comprises the event distribution analyzing unit 10. The event distribution analyzing unit 10 refers to the grid event table stored by the event grid matching unit 401 to calculate a value indicative of a degree of variation in speed which is described in event data corresponding to a grid on a grid basis. While among examples of a value indicative of a variation is dispersion, a difference between a maximum value and a minimum value may be used as a value indicative of variation. In the following, description will be made, as an example, of a case where the event distribution analyzing unit 10 calculates dispersion of speeds described in event data corresponding to a grid on a grid basis.

When the grid event table shown in FIG. 13 is generated, for example, the event distribution analyzing unit 10 calculate a dispersion of a speed of event data specified by a set of IDs {E1, E2, E3, E4, E5} corresponding to the grid ID "G1". The event distribution analyzing unit 10 similarly calculate a dispersion of a speed described in event data also with respect to other grid ID.

The matching precision evaluation unit 9 determines a minimum number of events and a maximum number of events of each grid ID according to a dispersion value of each grid ID calculated by the event distribution analyzing unit 10. The matching precision evaluation unit 9 determines a minimum number of events and a maximum number of events to be a larger value as the dispersion value becomes larger while satisfying that "the minimum number of events" is smaller than "the maximum number of events". For example, as a value proportional to a dispersion value, a minimum number of events and a maximum number of events may be determined on a grid ID basis. Calculation of a minimum number of events and a maximum number of events is one example and a minimum number of events and a maximum number of events may be determined on a grid ID basis by other calculation. Any calculation is possible for a minimum number of events and a maximum number of events as long as a minimum number of events and a maximum number of events are set to be a larger value as a dispersion is increased while satisfying that "the minimum number of events" is smaller than "the maximum number of events".

The matching precision evaluation unit 9, similarly to the second exemplary embodiment, causes the grid road storage unit 3 to store the minimum number of events and the maximum number of events determined on a grid ID basis so as to be correlated with the grid ID. The unit operates similarly to the event processing priority determination unit 402.

While the foregoing description has been made, as an example, of a case where dispersion of a speed is used, other than a dispersion, any value that indicates a variation in speed can be used such as a difference between a speed and a maximum value and a minimum value. In addition, while the description has been here made, as an example, of a case where the event analysis unit 6 makes analysis by using a speed to calculate a maximum number of events and a minimum number of events according to a degree of variation in speed, a calculation target is not limited to a speed and any data for use in analysis by the event analysis unit 6 can be used.

It is considered that the larger a variation in value for use in analysis becomes, the larger is required as the number of pieces of event data for analysis. Accordingly, the present exemplary embodiment also enables high-speed map matching while suppressing deterioration in precision, thereby realizing event data analysis with high precision.

Fifth Exemplary Embodiment

Figure 27:
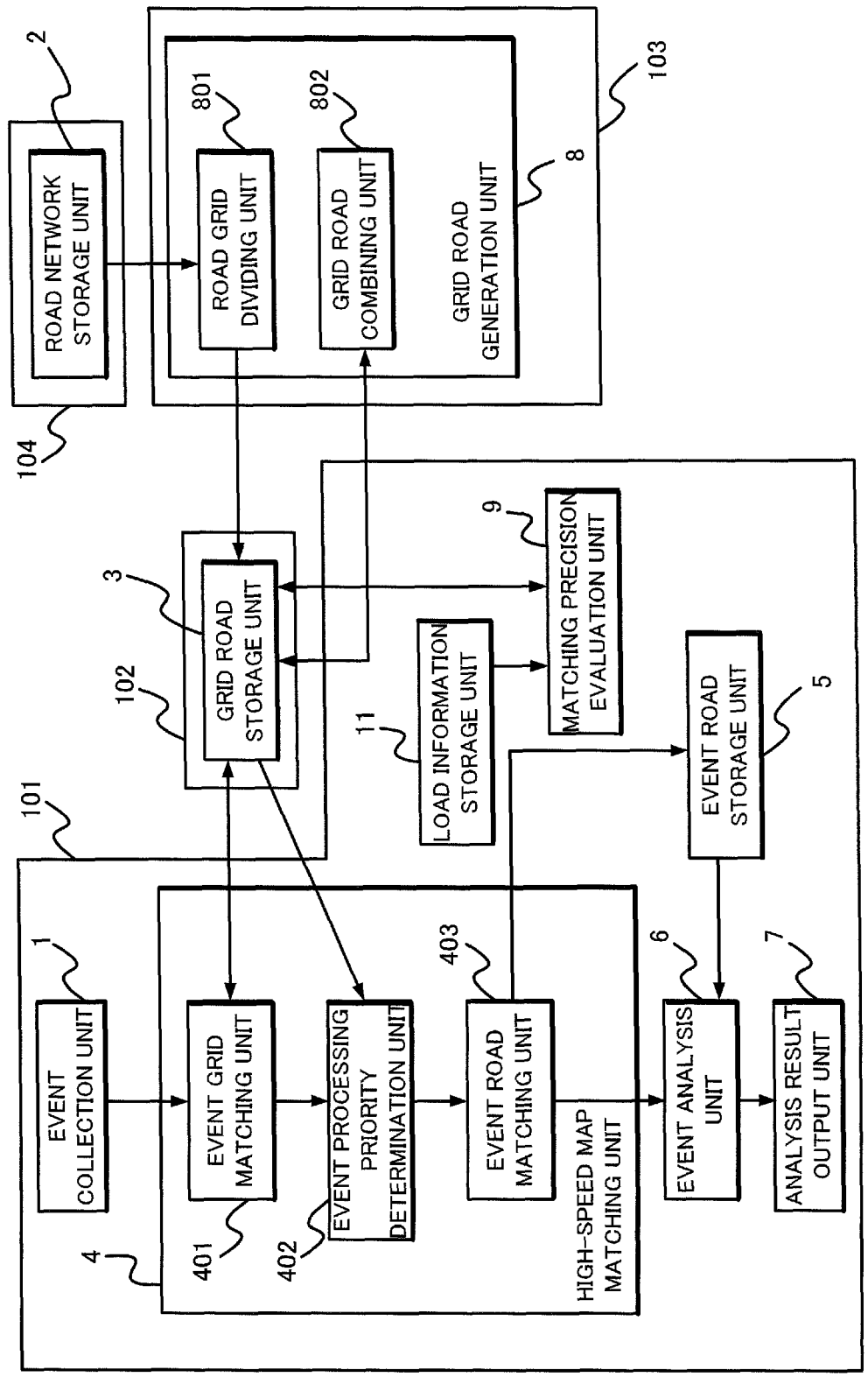
FIG. 27 is a block diagram showing an example of a fifth exemplary embodiment according to the present invention.

FIG. 27 is a block diagram showing an example of a fifth exemplary embodiment of the present invention. The same components as those of the first exemplary embodiment and the fourth exemplary embodiment are given the same reference numerals as those in FIG. 1 and FIG. 26 to omit their description. In the present exemplary embodiment, however, operation of the matching precision evaluation unit 9 differs from that of the fourth exemplary embodiment. Also in the present exemplary embodiment, while the matching precision evaluation unit 9 is preferably provided in the map matching device 101, it can be provided in other device. When the matching precision evaluation unit 9 is provided in the map matching device 101, the matching precision evaluation unit 9, the high-speed map matching unit 4 and a load information storage unit 11 are realized by the same CPU operable according to the map matching program.

Also in the present exemplary embodiment, it is assumed that in the grid arc table, a minimum number of events and a maximum number of events are correlated with each other on a grid ID basis as shown in FIG. 23.

The matching precision evaluation unit 9 according to the present exemplary embodiment changes the maximum number of events determined on a grid basis according to a load condition of a computer operable as the high-speed map matching unit 4.

Figures 28, 29:
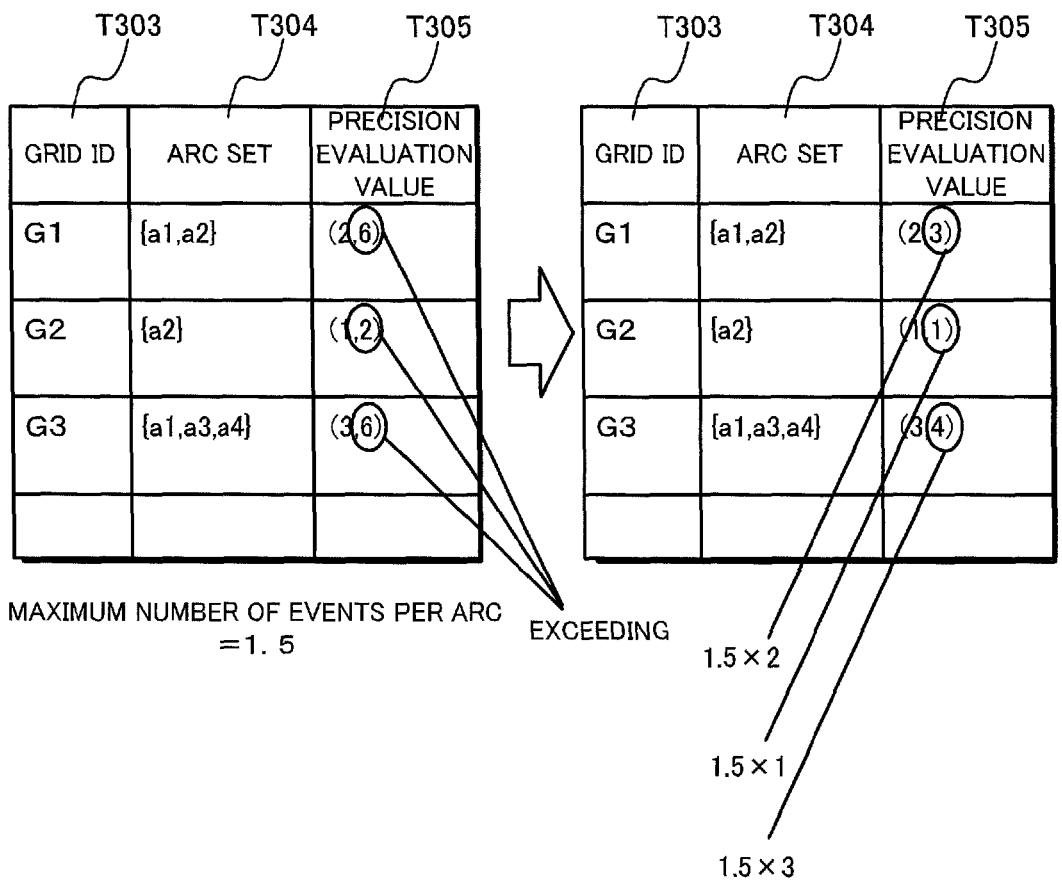
FIG. 28 is a diagram for use in explaining an example of an event processing capacity table.
FIG. 29 is a diagram for use in explaining an example of operation of rectifying the maximum number of events.

The map matching device 101 according to the present exemplary embodiment comprises the load information storage unit 11. The load information storage unit 11 monitors a load condition of a computer (the map matching device 101 in the example shown in FIG. 27) operable as the high-speed map matching unit 4. The load information storage unit 11 also stores an event processing capacity table indicative of a relationship between a load condition of the computer and a maximum number of pieces of event data which can be analyzed per unit time (one second here). FIG. 28 shows an example of the event processing capacity table. Maximum number of pieces of event data which can be analyzed per unit time (hereinafter referred to as the maximum number of events processed) represents a maximum number of pieces of event data that enables, within a unit time, operation to be executed from when the event collection unit 1 inputs event data to the event grid matching unit 401 until when the event analysis unit 6 causes the analysis result output unit 7 to output an analysis result related to event data.

Load T1101 shown in FIG. 28 represents a stage of a load of the computer operable as the high-speed map matching unit 4. In the example shown in FIG. 27, a stage of a computer load is represented as a value not less than 0 and less than 10.

Maximum number of events processed T1102 shown in FIG. 28 represents the maximum number of pieces of event data that can be analyzed per second. In the example shown in FIG. 28, when a load of the computer is not less than 6 and less than 10, the maximum number of events processed is 3000. Accordingly, when the load of the computer is 6.2, for example, the event collection unit 1 inputs event data to the maximum of 3000 to the event grid matching unit 401 per second, so that the event analysis unit 6 is allowed to cause the analysis result output unit 7 to output an analysis result related to the event data. The maximum number of events processed T1102 is determined to be a larger value as a load is reduced.

The load information storage unit 11 obtains a load condition from a computer itself operable according to an OS and refers to the event processing capacity table to specify the maximum number of events processed according to the load condition.

The matching precision evaluation unit 9 changes the maximum number of events in the grid arc table according to the maximum number of events processed which is specified by the load information storage unit 11. The matching precision evaluation unit 9, for example, obtains a value that is obtained by dividing the maximum number of events processed which is specified by the load information storage unit 11 by the total number of arcs. This value will be referred to as the maximum number of events processed per arc. The matching precision evaluation unit 9 refers to the grid arc table shown in FIG. 23 and when the already determined maximum number of events is larger than the product of the number of arcs corresponding to a grid ID and the maximum number of events processed per arc, rectifies the maximum number of events to a largest integer not more than the calculated product value. In addition, when the product of the number of arcs corresponding to the grid ID and the maximum number of events processed per arc is not less than the maximum number of events determined in advance, return the maximum number of events processed to the maximum number of events determined in advance.

Assume, for example, that the load of the computer is 6.2 and the event grid matching unit 401 determines that the maximum number of events processed is 3000. Also assume that the total number of arcs is 2000. The matching precision evaluation unit 9 only needs to, for example, count the number of arc IDs in the arc information table stored in the road network storage unit 2 to obtain the total number of arcs. In a case of the present example, the matching precision evaluation unit 9 calculates the maximum number of events processed per arc to be 3000/2000=1.5.

FIG. 29 is a diagram for use in explaining an example of operation of rectifying the maximum number of events in the grid arc table. Assume that as described above, the maximum number of events processed per arc is calculated as 1.5. Since with the grid ID "G1", corresponding arcs are two, a1 and a2, the matching precision evaluation unit 9 obtains the product of the maximum number of events processed and the number of arcs, two. In this case, 1.5×2=3 is obtained. The maximum number of events, six, corresponding to the grid ID "G1" is larger than the calculation result "3". The matching precision evaluation unit 9 accordingly changes the maximum number of events, six, to a largest integer (3 here) not more than the calculation result "3" (see the first record shown in FIG. 29).

The matching precision evaluation unit 9 executes the same processing with respect to other grid ID.

Similarly to the second exemplary embodiment, the event processing priority determination unit 402 reads the maximum number of events shown in the grid arc table to execute the processing of Step S40205 (see FIG. 14). Operation of the event processing priority determination unit 402 is the same as that of the second exemplary embodiment.

The present exemplary embodiment enables a map matching processing speed or analysis precision to be controlled according to a load condition of a computer. More specifically, when a load of the computer is large, an increase in a computer processing load can be suppressed by reducing the number of pieces of event data to be selected at Step S40205 (see FIG. 14). When the computer load is small, an analysis precision can be increased by reducing the number of pieces of event data to be selected at Step S40205.

Sixth Exemplary Embodiment

Figure 30:
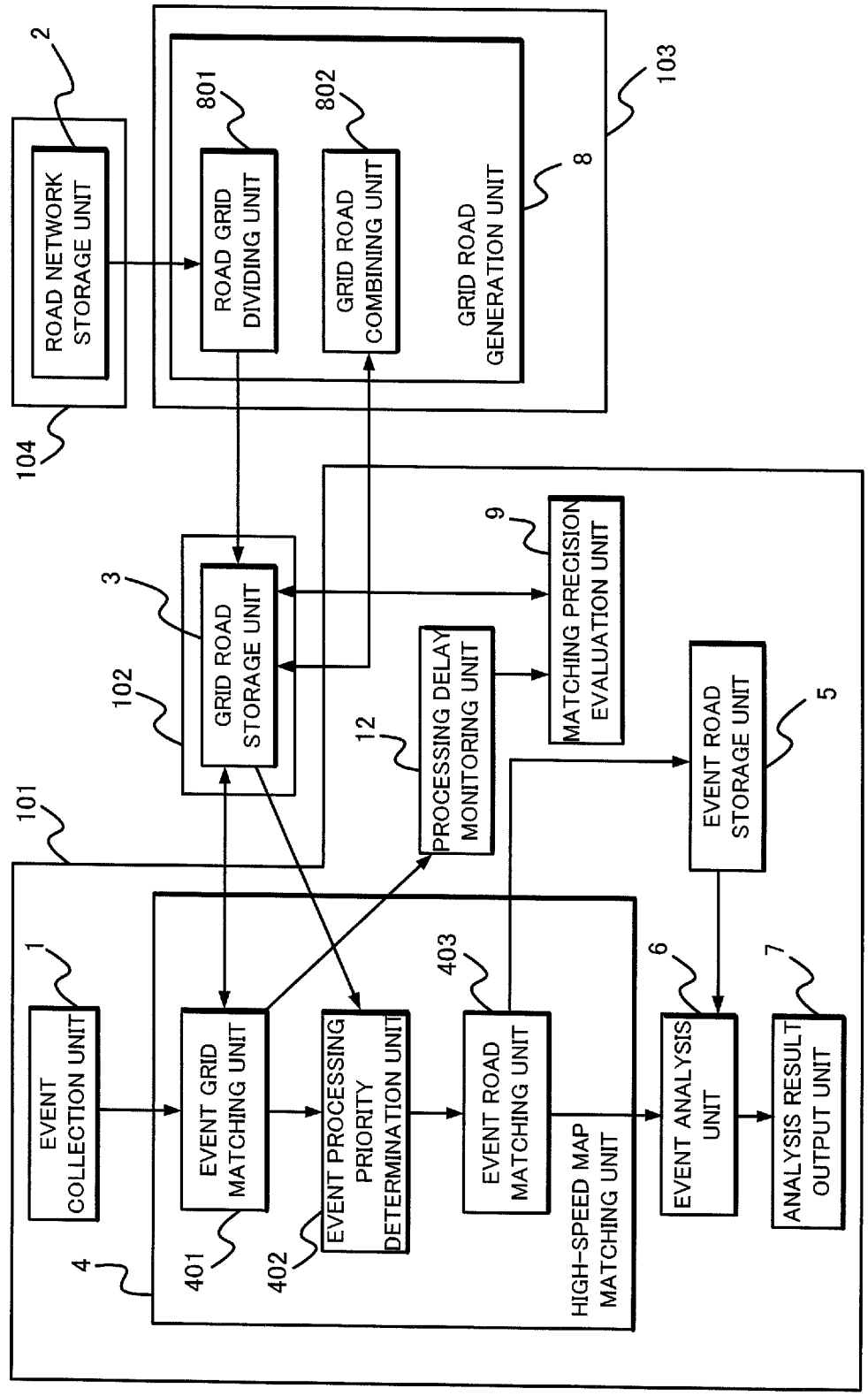
FIG. 30 is a block diagram showing an example of a sixth exemplary embodiment according to the present invention.

FIG. 30 is a block diagram showing an example of a sixth exemplary embodiment of the present invention. The same components as those of the first exemplary embodiment and the fourth exemplary embodiment are given the same reference numerals as those in FIG. 1 and FIG. 26 to omit their description. In the present exemplary embodiment, however, operation of the matching precision evaluation unit 9 differs from that of the fourth exemplary embodiment. Also in the present exemplary embodiment, while the matching precision evaluation unit 9 is preferably provided in the map matching device 101, it can be provided in other device. When the matching precision evaluation unit 9 is provided in the map matching device 101, the matching precision evaluation unit 9, the high-speed map matching unit 4 and a processing delay monitoring unit 12 are realized by the same CPU operable according to the map matching program.

Also in the present exemplary embodiment, similarly to the fifth exemplary embodiment, it is assumed that in the grid arc table, a minimum number of events and a maximum number of events are correlated with each other on a grid ID basis as shown in FIG. 23.

The matching precision evaluation unit 9 according to the present exemplary embodiment changes the maximum number of events and the minimum number of events determined on a grid basis according to whether the number of pieces of event data stored in the event storage unit 40101 by the event collection unit 1 (in other words, the number of pieces of event data received by the event collection unit 1) is increased or decreased.

The map matching device 101 according to the present exemplary embodiment comprises the processing delay monitoring unit 12. The processing delay monitoring unit 12 periodically counts a total number of pieces of event data stored in the event storage unit 40101 to determine whether the total number of pieces of event data stored in the event storage unit 40101 is increasing or decreasing. The processing delay monitoring unit 12 counts the number of pieces of event data at fixed intervals and when being positive as a difference obtained by subtracting a result of one-preceding count from a current count result continues, determination is made that the total number is increasing and when being negative as the difference continues, determination is made that the total number is decreasing. For example, the processing delay monitoring unit 12 counts and stores the total number of pieces of event data stored in the event storage unit 40101 on a minute basis while referring to the count results of past ten minutes. From each count result of the past ten minutes, the processing delay monitoring unit 12 obtains each difference by subtracting one-preceding count result from each current count result. When all the differences are positive, determination is made that the total number of pieces of event data stored in the event storage unit 40101 is increasing. On the other hand, when all the differences are negative, determination is made that the total number of pieces of event data stored in the event storage unit 40101 is decreasing. Determination shown here is an example only and the processing delay monitoring unit 12 may make determination whether the total number is increasing or decreasing. It is, for example, possible to classify an increasing/decreasing tendency into finer levels.

FIG. 31 is a diagram for use in explaining an example of operation of the matching precision evaluation unit 9 changing a maximum number of events and a minimum number of events according to an increasing/decreasing tendency of event data. When the determination is made that the number of pieces of event data stored in the event storage unit 40101 is increasing, the matching precision evaluation unit 9 decreases each maximum number of events corresponding to each grid ID. At this time, each minimum number of events corresponding to each grid ID may be changed as well. When the determination is made that the number of pieces of event data stored in the event storage unit 40101 is decreasing, the matching precision evaluation unit 9 increases each minimum number of events corresponding to each grid ID. At this time, each maximum number of events corresponding to each grid ID may be changed as well.

In the description of the first record shown in FIG. 31 as an example, when the number of pieces of event data is increasing, the maximum number of events is decreased to change the precision evaluation value from (2,6) to (2,5). On the other hand, when the number of pieces of event data is decreasing, the minimum number of events is increased to change the precision evaluation value from (2,6) to (3,6).

Operation of the event processing priority determination unit 402 is the same as that of the second exemplary embodiment.

The sixth exemplary embodiment enables control of an analysis precision according to an increase/decrease in the number of pieces of event data stored in the event storage unit 40101 by the event collection unit 1.

As is already described, a minimum number of events needs not to be determined in the present invention. In this case, it is only necessary to control the maximum number of events in each of the second through sixth exemplary embodiments.

In each of the second, third, fourth and sixth exemplary embodiments, the minimum number of events and the maximum number of events are changed, while in the fifth exemplary embodiment, only the maximum number of events is changed. The map matching system according to the present invention may change only the minimum number of events according to a condition of event data or the like.

According to the above-described exemplary embodiments of the present invention, the grid road combining unit assigns a common arc ID to a plurality of grids which are adjacent to each other and whose sets of arcs correlated are coincident, assigns an arc ID to a grid whose set of arcs correlated is different from that of any of adjacent grids and causes the storage device to store information indicative of a relationship among a range of a grid derived by the road grid dividing unit, a grid ID and an arc passing the grid, and the event data selection unit selects, on a basis of a grid ID correlated with event data, when the number of pieces of event data correlated is larger than a threshold value, as many pieces of event data as the number of the threshold value and when the number of pieces of event data correlated is not more than the threshold value, selects all the correlated event data. It is accordingly possible to reduce the amount of the processing executed on an event ID basis and reduce the amount of processing of the event road matching unit executed on an event data basis. As a result, the processing can be sped up.

In addition, since vehicles running on the same road have similar event data in many cases, even when as many pieces of event data as the number of a threshold value are selected from among event data correlated with a grid ID, an analysis precision can be maintained. Accordingly, even when event data is transmitted from numerous vehicles, map matching can be executed at a high speed while keeping a precision of an analysis based on a map matching result. Since a purpose of use of information indicative of a correspondence relationship between event data whose arc is specified by the event road matching unit and the arc is not limited, it can be generally used for various kinds of analyses.

While the present invention has been described with reference to the preferred modes of implementation (and exemplary embodiments) in the foregoing, the present invention is not limited to the above-described modes of implementation (and exemplary embodiments). The structures and details of the present invention allow various modifications understandable by those skilled in the art within the scope of the present invention.

INDUSTRIAL APPLICABILITY

The present invention is preferably applicable to a map matching system which correlates event data generated by a vehicle and a road.

The invention claimed is:

1. A map matching device accessible to a road data storage device which stores information indicative of a relationship among a range of each grid obtained by dividing a region where a road network exists in a latitude direction and a longitude direction by equal spaces, a grid ID unitarily assigned to each set of grids whose sets of arcs which are roads are common and an arc passing the grid, comprising:
    an event collecting unit for receiving event data indicative of a position and a state of a vehicle;
    a processor configured to provide:
    an event grid matching unit for specifying a grid ID of a grid to which a generation position included in event data received by said event collecting unit belongs to generate information with the grid ID and the event data correlated with reference to the information stored in said road data storage device;
    an event data selecting unit for selecting, on a basis of a grid ID correlated with event data by said event grid matching unit, when the number of pieces of event data correlated is larger than a threshold value, as many pieces of event data as the threshold value and when the number of pieces of event data correlated is not more than the threshold value, selecting all the event data correlated; and
    an event road matching unit for specifying, on a basis of each event data selected by said event data selecting unit, an arc closest to a generation position of the event data from among arcs correlated with a grid ID corresponding to the event data; and
    an event road storing unit for storing information indicative of a correspondence relationship between an arc specified by said event road matching unit and event data.

2. The map matching device according to claim 1, wherein the processor is further configured to provide
    a threshold value control unit for determining a threshold value for use by said event data selecting unit on a grid ID basis such that the threshold value becomes larger as the number of arcs corresponding to the grid ID is increased.

3. The map matching device according to claim 1, wherein the processor is further configured to provide
    a threshold value control unit for calculating a length of an arc in a grid corresponding to each grid ID to determine a threshold value for use by said event data selecting unit on a grid ID basis such that the threshold value becomes larger as the length of the arc in the grid corresponding to the grid ID is increased.

4. The map matching device according to claim 1, wherein the processor is further configured to provide
    an event distribution analyzing unit for calculating, with reference to information with a grid ID and event data correlated which is generated by said event grid matching unit, a degree of variation in speed in the event data corresponding to the grid ID on a grid ID basis, and
    a threshold value control unit for determining a threshold value for use by said event data selecting unit on a grid ID basis such that the threshold value becomes larger as a degree of variation in speed becomes higher.

5. The map matching device according to claim 1, wherein the processor is further configured to provide:
    a threshold value control unit for determining a threshold value for use by said event data selecting unit such that the threshold value becomes larger as a load of the map matching device is increased.

6. The map matching device according to claim 1, wherein the processor is further configured to provide:
   a monitoring unit for determining whether the number of pieces of event data received by said event collecting unit is increasing or decreasing, and
   a threshold value control unit for varying a threshold value for use by said event data selecting unit according to whether the number of pieces of event data received by said event collecting unit is increasing or decreasing.

7. A map matching method to be applied to a map matching device accessible to a road data storage device which stores information indicative of a relationship among a range of each grid obtained by dividing a region where a road network exists in a latitude direction and a longitude direction by equal spaces, a grid ID unitarily assigned to each set of grids whose sets of arcs which are roads are common and an arc passing the grid, the method comprising:
   receiving event data indicative of a position and a state of a vehicle,
   specifying, by a processor, a grid ID of a grid to which a generation position included in event data received by said event collecting unit belongs to generate information with the grid ID and the event data correlated with reference to the information stored in said road data storage device,
   selecting, by the processor, on a basis of a grid ID correlated with event data, when the number of pieces of event data correlated is larger than a threshold value, as many pieces of event data as the threshold value and when the number of pieces of event data correlated is not more than the threshold value, selects all the event data correlated, and
   specifying, by the processor, on a basis of each selected event data, an arc closest to a generation position of the event data from among arcs correlated with a grid ID corresponding to the event data.

8. The map matching method according to claim 7, further comprising: determining a threshold value for use by said event data selecting unit on a grid ID basis such that the threshold value becomes larger as the number of arcs corresponding to the grid ID is increased.

9. The map matching method according to claim 7,
   further comprising: calculating a length of an arc in a grid corresponding to each grid ID to determine a threshold value for use in the selecting on a grid ID basis such that the threshold value becomes larger as the length of the arc in the grid corresponding to the grid ID is increased.

10. The map matching method according to claim 7,
    further comprising: calculating, with reference to information with a grid ID and event data correlated, a degree of variation in speed in the event data corresponding to the grid ID on a grid ID basis, and
    determining a threshold value for use in the selecting on a grid ID basis such that the threshold value becomes larger as a degree of variation in speed is becomes higher.

11. The map matching method according to claim 7,
    further comprising: calculating a threshold value for use in the selecting such that the threshold value becomes larger as a load of the map matching device is increased.

12. The map matching method according to claim 7,
    further comprising: determining whether the number of pieces of event data received is increasing or decreasing, and
    varying varies a threshold value for use in the selecting according to whether the number of pieces of event data received is increasing or decreasing.

13. A non-transitory computer readable storage medium showing a map matching program mounted on a computer accessible to a road data storage device which stores information indicative of a relationship among a range of each grid obtained by dividing a region where a road network exists in a latitude direction and a longitude direction by equal spaces, a grid ID unitarily assigned to each set of grids whose sets of arcs which are roads are common and an arc passing the grid, the map matching program causes said computer to execute:
    receiving event data indicative of a position and a state of a vehicle;
    specifying a grid ID of a grid to which a generation position included in event data received belongs to generate information with the grid ID and the event data correlated with reference to the information stored in said road data storage device;
    selecting, on a basis of a grid ID correlated with event data, when the number of pieces of event data correlated is larger than a threshold value, as many pieces of event data as the threshold value and when the number of pieces of event data correlated is not more than the threshold value, selecting all the event data correlated; and
    specifying, on a basis of each event data selected, an arc closest to a generation position of the event data from among arcs correlated with a grid ID corresponding to the event data.

14. The non-transitory computer readable storage medium according to claim 13, wherein the map matching program further causes the computer to execute determining a threshold value for use in the selecting processing on a grid ID basis such that the threshold value becomes larger as the number of arcs corresponding to the grid ID is increased.

15. The non-transitory computer readable storage medium according to claim 13, wherein the map matching program further causes the computer to execute
    calculating a length of an arc in a grid corresponding to each grid ID to determine a threshold value for use in the selecting on a grid ID basis such that the threshold value becomes larger as the length of the arc in the grid corresponding to the grid ID is increased.

16. The non-transitory computer readable storage medium according to claim 13, wherein the map matching program further causes the computer to execute:
    calculating, with reference to information with a grid ID and event data correlated, a degree of variation in speed in the event data corresponding to the grid ID on a grid ID basis, and
    determining a threshold value for use the selecting on a grid ID basis such that the threshold value becomes larger as a degree of variation in speed becomes higher.

17. The non-transitory computer readable storage medium according to claim 13, wherein the map matching program further causes the computer to execute
    determining a threshold value for use in the selecting such that the threshold value becomes larger as a load of said computer is increased.

18. The non-transitory computer readable storage medium according to claim 13, wherein the map matching program further causes the computer to execute:
    determining whether the number of pieces of event data received is increasing or decreasing, and
    varying a threshold value for use in the selecting according to whether the number of pieces of event data received is increasing or decreasing.

* * * * *